(12) United States Patent
Ishimaru et al.

(10) Patent No.: US 7,150,693 B2
(45) Date of Patent: Dec. 19, 2006

(54) HYDROSTATIC TRANSMISSION AND POWER TRAIN FOR VEHICLE

(76) Inventors: Yoshitaka Ishimaru, 18-1, Inadera 2-chome Amagasaki-shi, Hyogo (JP) 661-0981; Shigenori Sakikawa, 18-1, Inadera 2-chome Amagasaki-shi, Hyogo (JP) 661-0981; Shinya Sakakura, 18-1, Inadera 2-chome Amagasaki-shi, Hyogo (JP) 661-0981

( * ) Notice: Subject to any disclaimer, the term of this patent is extended or adjusted under 35 U.S.C. 154(b) by 144 days.

(21) Appl. No.: 10/942,932

(22) Filed: Sep. 17, 2004

(65) Prior Publication Data

US 2005/0039451 A1 Feb. 24, 2005

Related U.S. Application Data

(60) Continuation of application No. 10/463,493, filed on Jun. 18, 2003, now Pat. No. 6,802,183, which is a division of application No. 09/935,700, filed on Aug. 24, 2001, now Pat. No. 6,601,474.

(30) Foreign Application Priority Data

| Sep. 5, 2000 | (JP) | ............................. 2000-269308 |
| Dec. 19, 2000 | (JP) | ............................. 2000-385466 |
| Jan. 9, 2001 | (JP) | ............................. 2001-001714 |
| Jan. 12, 2001 | (JP) | ............................. 2001-005014 |

(51) Int. Cl.
*F16H 37/08* (2006.01)

(52) U.S. Cl. ...................... 475/206; 475/198; 475/200

(58) Field of Classification Search .................. 475/72, 475/74, 80, 83, 198, 200, 201, 206
See application file for complete search history.

(56) References Cited

U.S. PATENT DOCUMENTS

| 3,788,164 A | | 1/1974 | Ojima | |
| 3,903,755 A | * | 9/1975 | Polak | ........................... 475/82 |
| 3,969,958 A | * | 7/1976 | Miyao et al. | ................. 475/82 |
| 4,304,317 A | | 12/1981 | Vanzant et al. | |
| 4,491,034 A | * | 1/1985 | Fredriksen | .................... 475/80 |
| 4,559,846 A | | 12/1985 | Cochran et al. | |

(Continued)

*Primary Examiner*—Ha Ho
(74) *Attorney, Agent, or Firm*—Sterne, Kessler, Goldstein & Fox P.L.L.C.

(57) ABSTRACT

A hydrostatic transmission for vehicle interposed in a drive-power transmission path between a driving power source and a driving axle for non-stepwisely changing the speed of the vehicle includes an HST housing; a hydraulic pump unit having a pump shaft with first and second ends extending in a fore-aft direction of the vehicle away from each other; a hydraulic motor unit having a motor shaft for outputting the drive power from the motor shaft whose speed is non-stepwisely varied in cooperation with the hydraulic pump unit; a PTO unit having a PTO shaft extending in the fore-aft direction of the vehicle, the PTO shaft being operatively connected to the pump shaft; a charge pump unit for replenishing pressurized hydraulic fluid to a hydraulic circuit, the hydraulic circuit hydraulically connecting the hydraulic pump unit with the hydraulic motor unit, the charge pump unit including a charge pump body, and a charge pump case connected to the HST housing through its wall closer to the driving axle for supporting the charge pump body; the PTO shaft having an one end closer to the driving axle, the one end extending outwardly through the HST housing to have an outer extension positioned outside of the HST housing; and the charge pump case being designed so as to bearing-support the outer extension of the PTO shaft.

4 Claims, 22 Drawing Sheets

U.S. PATENT DOCUMENTS

| | | |
|---|---|---|
| 4,704,917 A | 11/1987 | Hiroyasu |
| 4,930,296 A | 6/1990 | Takei et al. |
| 5,052,245 A * | 10/1991 | Kigoshi ................. 74/665 T |
| 5,054,335 A * | 10/1991 | Andrews ............. 74/665 GA |
| 5,142,940 A | 9/1992 | Hasegawa |
| 5,560,447 A | 10/1996 | Ishii et al. |
| 5,564,518 A | 10/1996 | Ishii |
| 5,700,222 A * | 12/1997 | Bowen ....................... 475/204 |
| 5,884,526 A | 3/1999 | Fogelberg |
| 5,913,950 A | 6/1999 | Matsufuji |
| 6,000,296 A | 12/1999 | Sundguist |
| 6,199,380 B1 | 3/2001 | Ishii |
| 6,457,546 B1 | 10/2002 | Ishimaru et al. |

* cited by examiner

HYDROSTATIC TRANSMISSION AND POWER TRAIN FOR VEHICLE

BACKGROUND OF THE INVENTION

The present invention relates to a hydrostatic transmission (hereinafter referred to as HST) for vehicle that is interposed in a drive-power transmission path between a drive power source and a driving axle, and a power train for vehicle between the drive power source and the driving axle.

It is known that the HST interposed in the drive-power transmission path between the drive power source and the driving axle is provided with a PTO unit for driving a working device. FIG. 9(a) is a model view illustrating a drive-power transmission in the arrangement that a conventional HST with a PTO unit is applied to a vehicle that has a front axle serving as a driving axle and is provided on the front side of the, vehicle with a mower or any other working device.

As illustrated in FIG. 9(a), the HST with the PTO unit includes a hydraulic pump unit with a pump shaft operatively connected to the drive power source, a hydraulic motor unit with a motor shaft for outputting the drive power through the motor shaft whose speed is non-stepwisely varied in cooperation with the hydraulic pump unit, a PTO unit with a PTO shaft operatively connected to the pump shaft, and an HST housing accommodating the hydraulic pump unit, the hydraulic motor unit and the PTO unit, in which the PTO shaft has a front end extending forwardly through the HST housing.

In some cases, a demand exists for a wide range of speed change of the driving axle and reduced load applied to the HST serving as a main speed change device. In that case, a mechanical transmission serving as an auxiliary speed change device is additionally interposed between the HST as the main speed change device and the driving axle. FIG. 9(b) is a model view illustrating a drive-power transmission path between the drive power source and the driving axle (front axle) in which the HST with the PTO unit and the mechanical transmission are interposed.

Here, comparing the distance between the front end of the PTO shaft and the front axle (hereinafter referred to distance L) in the arrangement of FIG. 9(a) with the distance L of the arrangement of FIG. 9(b), the former arrangement is: L=L1, and the latter arrangement is: L=L1+L2, in which L2 represents the length of the mechanical transmission with respect to a fore-aft direction of the vehicle.

The front end of the PTO shaft is connected to the mower or any other working device via transmission parts such as a connecting rod with a universal joint. Accordingly, the variation of the distance L necessitates the modification of the transmission parts, the working device and any other associated parts.

Taking for example the vehicle that is provided with the mower as the working device having an elevation function, the variation of the distance L invites not only variation of the length of the connecting rod but also variation of the elevation height of the mower.

That is, since the front end of the PTO shaft serves as a fulcrum for the mower during the upward or downward movement, a simply elongated the elongation of the transmission shaft by L2 simply causes the mower to have a different elevation height. Therefore, in order to equalize the elevational height of the mower between the vehicles of FIGS. 9(a) and 9(b), there arises a necessity to modify a hydraulic piston for elevation of the mower or any other parts.

There thus exist the arrangements with only the main speed change device interposed in the drive-power transmission path, and both the main and auxiliary speed change devices interposed therein. In either arrangement, a demand exists for non-variation of the distance between the front end of the PTO shaft and the driving axle. In other words, a demand exists for the arrangement holding the distance between the front end of the PTO shaft and the driving axle constant regardless of the distance between the driving axle and the main speed change device.

The auxiliary speed change device is an optional member that is provided according to a specification of the vehicle. Therefore, regarding parts constituting the power train between the drive power source and the driving axle excepting the auxiliary speed change device, it is preferable to render those parts commonly usable as many as possible for both arrangements with and without the auxiliary speed change device.

The present invention has been conceived in consideration of the above prior arts. It is an object of the present invention to provide an HST that is capable of effectively limiting the variation in distance between an end of the PTO shaft and the driving axle, even if the distance between the driving axle and the HST is varied.

It is another object of the present invention to provide a power train for vehicle that is capable of being adapted to or matching arrangements with or without the auxiliary speed change device or modifications of the same, or meeting any other demands.

SUMMARY OF THE INVENTION

To achieve the above objects, there is provided a hydrostatic transmission for vehicle interposed in a drive-power transmission path between a driving power source and a driving axle for non-stepwisely changing the speed of the vehicle. The hydrostatic transmission includes an HST housing; a hydraulic pump unit disposed within the HST housing and having a pump shaft with first and second ends extending in a fore-aft direction of the vehicle away from each other, in which the first end is positioned closer to the driving axle, and the second end is positioned away from the driving axle and operatively connected to the driving power source; a hydraulic motor unit disposed within the HST housing and having a motor shaft for outputting the drive power from the motor shaft whose speed is non-stepwisely varied in cooperation with the hydraulic pump unit; a PTO unit disposed within the HST housing and having a PTO shaft extending in the fore-aft direction of the vehicle, the PTO shaft being operatively connected to the pump shaft; a charge pump unit for replenishing pressurized hydraulic fluid to a hydraulic circuit, the hydraulic circuit hydraulically connecting the hydraulic pump unit with the hydraulic motor unit, the charge pump unit including a charge pump body that is driven through the first end of the pump shaft, and a charge pump case connected to the HST housing through its wall closer to the driving axle for supporting the charge pump body; the PTO shaft having an one end closer to the driving axle, the one end extending outwardly through the HST housing to have an outer extension positioned outside of the HST housing; and the charge pump case being designed so as to bearing-support the outer extension of the PTO shaft.

According to the HST having the above arrangement, the outer extension of the PTO shaft is bearing-supported by the charge pump case that is connected to the HST housing. Therefore, the variation in distance between the second end of the PTO shaft and the driving axle can be effectively limited, even if the distance between the driving axle and the HST is varied. As a result, the common working device that is driven through the PTO shaft and the common drive power transmission mechanism for transmitting the drive power to the working device can be used for both the arrangements where the HST only is interposed in the drive-power transmission path and where the HST, and the mechanical transmission and/or the PTO device are interposed therein.

In the hydrostatic transmission having the above arrangement, the PTO unit preferably includes a hydraulic clutch device for on/off of the driver power transmission from the pump shaft to the PTO shaft. The charge pump unit also preferably includes a flow divider for dividing the pressurized fluid from the charge pump body to the one for replenishment to the hydraulic circuit and the other for actuation of the hydraulic clutch device, in which the flow divider is disposed within the charge pump case.

The first end of the pump shaft preferably extends outwardly through the charge pump case. The hydrostatic transmission also preferably includes an auxiliary pump unit detachably connected to the pump case for receiving the driving power through the first end of the pump shaft.

According to another aspect of the present invention, there is provided a power train for vehicle between a driving power source and a driving axle. The power train includes a transfer device disposed between a main speed change device that is operatively connected to the driving power source and a differential gear device that transmits the drive power to the driving axle. The transfer device includes a driving shaft and an output shaft. The driving shaft is disposed along a main drive-power transmission axis and operatively connected to a main output shaft of the main speed change device. The main transmission axis is coaxial with the main output shaft, and the output shaft is disposed along the main drive-power transmission axis for outputting the drive power to the differential gear device. With this arrangement, the speed can be stepwisely changed between the driving shaft and the output shaft.

With the power train of the above arrangement, the speed change range available in the drive-power transmission path can easily be widened. Also, by replacing the transfer device with a different one, the specification of the power train can easily be modified. That is, merely mounting or dismounting the transfer device, or modifying the same achieves matching to various specifications of the vehicle.

According to another aspect of the present invention, there is provided a power train for vehicle between a driving power source and a driving axle. The power train includes a transfer device disposed between a main speed change device that is operatively connected to the driving power source and a differential gear device that transmits the drive power to the driving axle. The transfer device includes a driving shaft and an output shaft. The driving shaft is disposed along a main drive-power transmission axis and operatively connected to a main output shaft of the main speed change device, in which the main transmission axis is coaxial with the main output shaft. The output shaft is disposed along the main drive-power transmission axis for outputting the drive power to the differential gear device, in which the drive power is transmitted between the driving shaft and the output shaft. The transfer device also includes an extension extending past the main speed change device in the direction orthogonal to the main drive-power transmission axis, a PTO shaft supported on the extension in such a manner as to be substantially parallel to the main drive-power transmission axis, and a drive-power transmission mechanism for transmitting the drive power synchronized with the output shaft to the PTO shaft.

With the power train having the above arrangement, the PTO shaft that takes off the drive power synchronized with the driving axle can be effectively prevented from interfering with the main speed change device. Thus, the drive-power transmission mechanism disposed on the downstream side of the PTO shaft can be relatively flexibly designed.

In the power train having the above arrangement, the drive-power transmission mechanism preferably includes a driven shaft that is disposed between the main drive-power transmission axis and the PTO shaft in parallel thereto, a first gear train for transmitting the drive power from the driving shaft to the driven shaft at a predetermined speed reducing ratio, a second gear train for transmitting the drive power from the driven shaft to the output shaft at the same speed reducing ratio as the predetermined speed reducing ratio, and a third gear train for transmitting the drive power from the driven shaft to the PTO shaft at the same speed reducing ratio as the predetermined speed reducing ratio.

With the power train having the above arrangement, the PTO shaft can effectively be rotated in synchronization with the output shaft, while sharing in part the common parts between the drive-power transmission line for the PTO system and the drive-power transmission line for the vehicle run. Thus, the transfer device can be manufactured compact as compared with the arrangement that the PTO drive power is taken off through the output shaft of the transfer device.

The power train preferably has the first gear train including an idle gear that is relatively rotatably supported on the driving shaft, and a first driven gear that is relatively non-rotatably supported on the driven shaft to be meshed with the idle gear; the second gear train including a second driven gear that is relatively non-rotatably supported on the driven shaft, and an output gear that is relatively non-rotatably supported on the output shaft to be meshed with the second driven gear; the third gear train including a PTO gear that is meshed with either one of the first and second driven gears to transmit the drive power to the PTO shaft. In this arrangement, the speed reducing ratio of the first driven gear with respect to the idle gear, the speed reducing ratio of the output gear with respect to the second driven gear, and the speed reducing ratio of the PTO gear with respect to the first or second driven gear are the same.

The transfer device preferably includes a clutch member that is relatively non-rotatably and axially slidably supported on the driving shaft. The clutch member is adapted to selectively take a position enabling connection between the driving shaft and the idle gear, a position enabling connection between the driving shaft and the output shaft, and a neutral position between both the positions, enabling shutdown of the drive-power transmission from the driving shaft to the output shaft.

With the arrangement above, through shifting operation of the clutch member, the output shaft and the PTO shaft can be brought into non-outputting state, or the output shaft and the PTO shaft can have speeds changeable in synchronization with each other.

The transfer device preferably includes a counter shaft that is disposed coaxially with the PTO shaft and a slider that is relatively non-rotatably and axially slidably on the PTO shaft and the counter shaft. The PTO gear is supported on the counter shaft via a one-way clutch. The slider is adapted to selectively take a non-outputting position enabling disconnection between the counter shaft and the PTO shaft, a forced outputting position enabling connection between the counter shaft and the PTO shaft while being in meshing engagement with the PTO gear, and a middle position between the non-outputting position and the forced outputting position, enabling connection between the counter shaft and the PTO shaft while being out of the meshing engagement with the PTO gear.

With the arrangement above, it is possible to easily change the outputting state of the PTO shaft. Specifically, through shifting operation of the slider, it is possible to easily change the mode of the PTO shaft between a mode enabling forced synchronization of the PTO shaft with the output shaft, a mode enabling shutdown of the drive power transmission from the output shaft to the PTO shaft when the PTO shaft rotates at a higher speed than the output shaft, and a mode enabling shutdown of the drive power transmission to the PTO shaft.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENT

Figure 1:
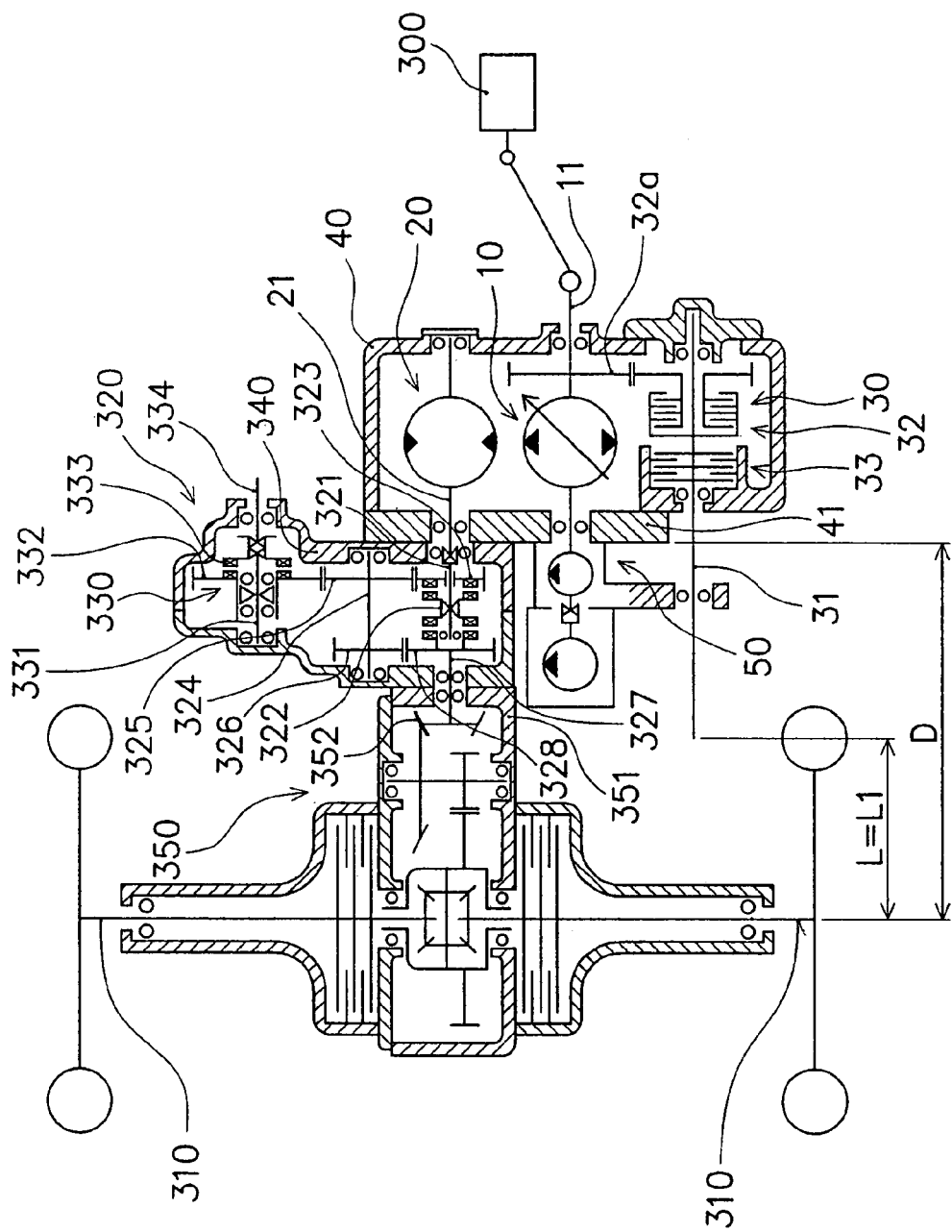
FIG. 1 is a model view illustrating a power train for a vehicle to which one embodiment of an HST of the present invention is applied.
Figure 2:
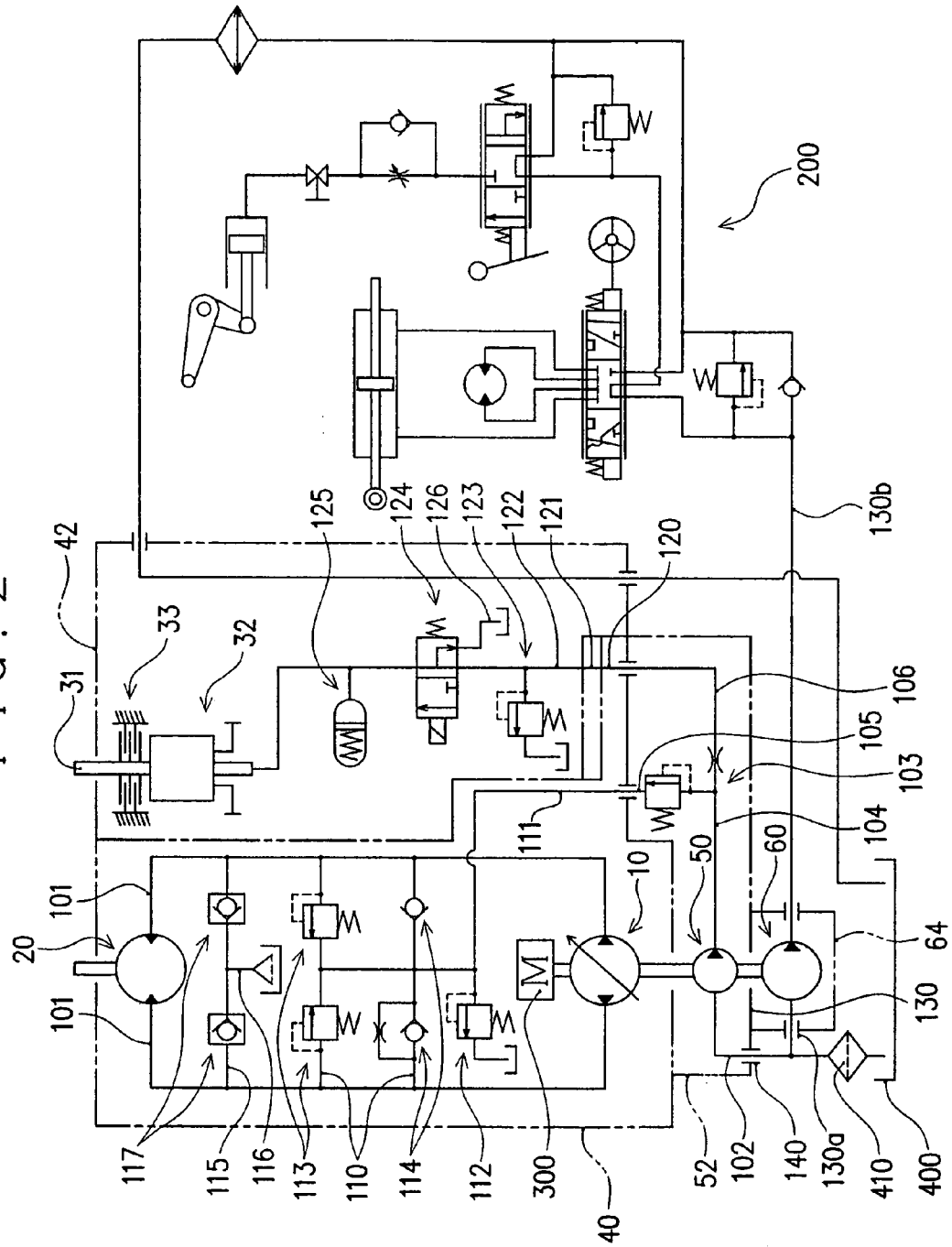
FIG. 2 is a hydraulic circuit diagram of the vehicle illustrated in FIG. 1.
Figure 3:
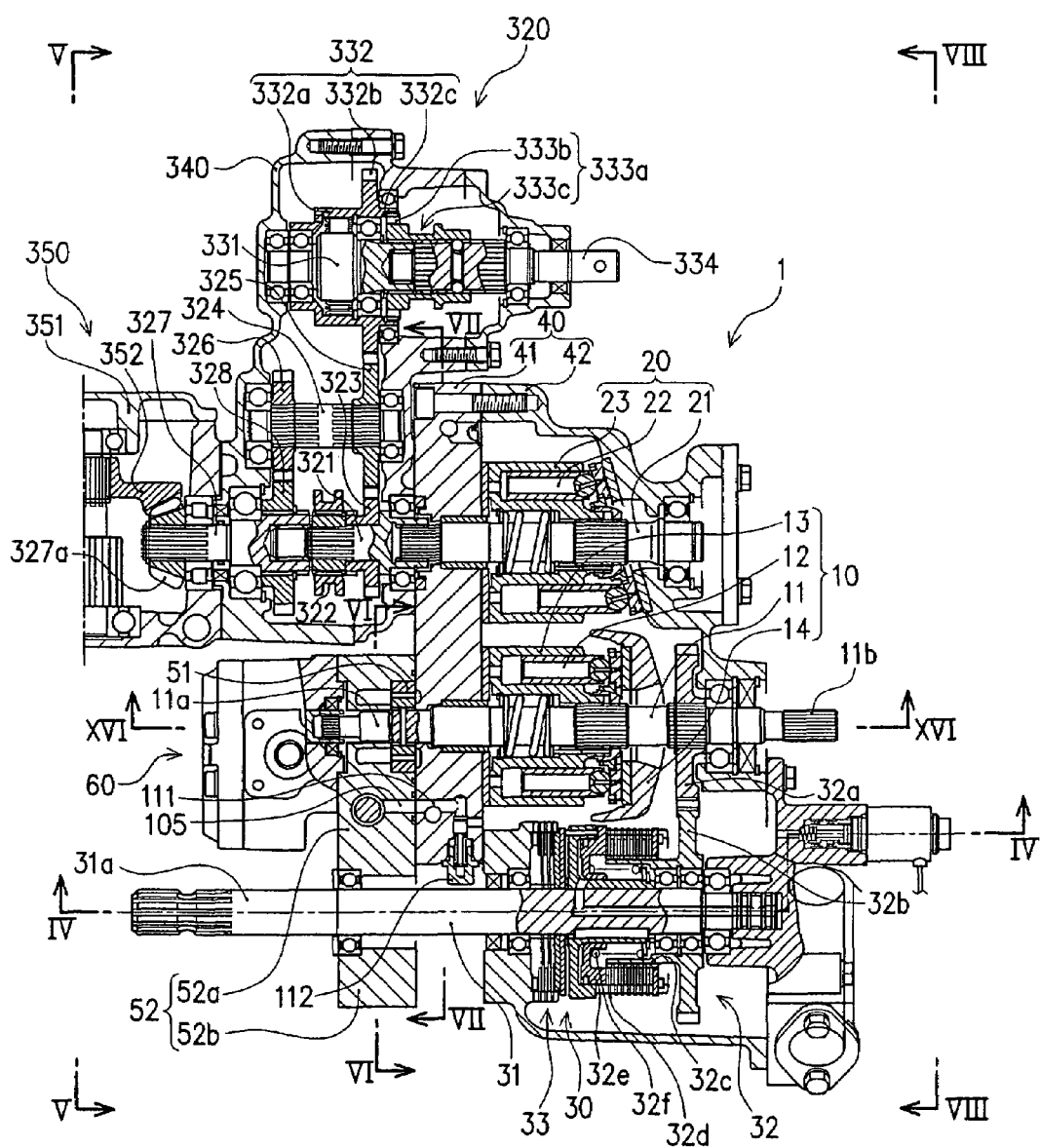
FIG. 3 is a transverse plan view of the HST illustrated in FIG. 1.
Figure 4:
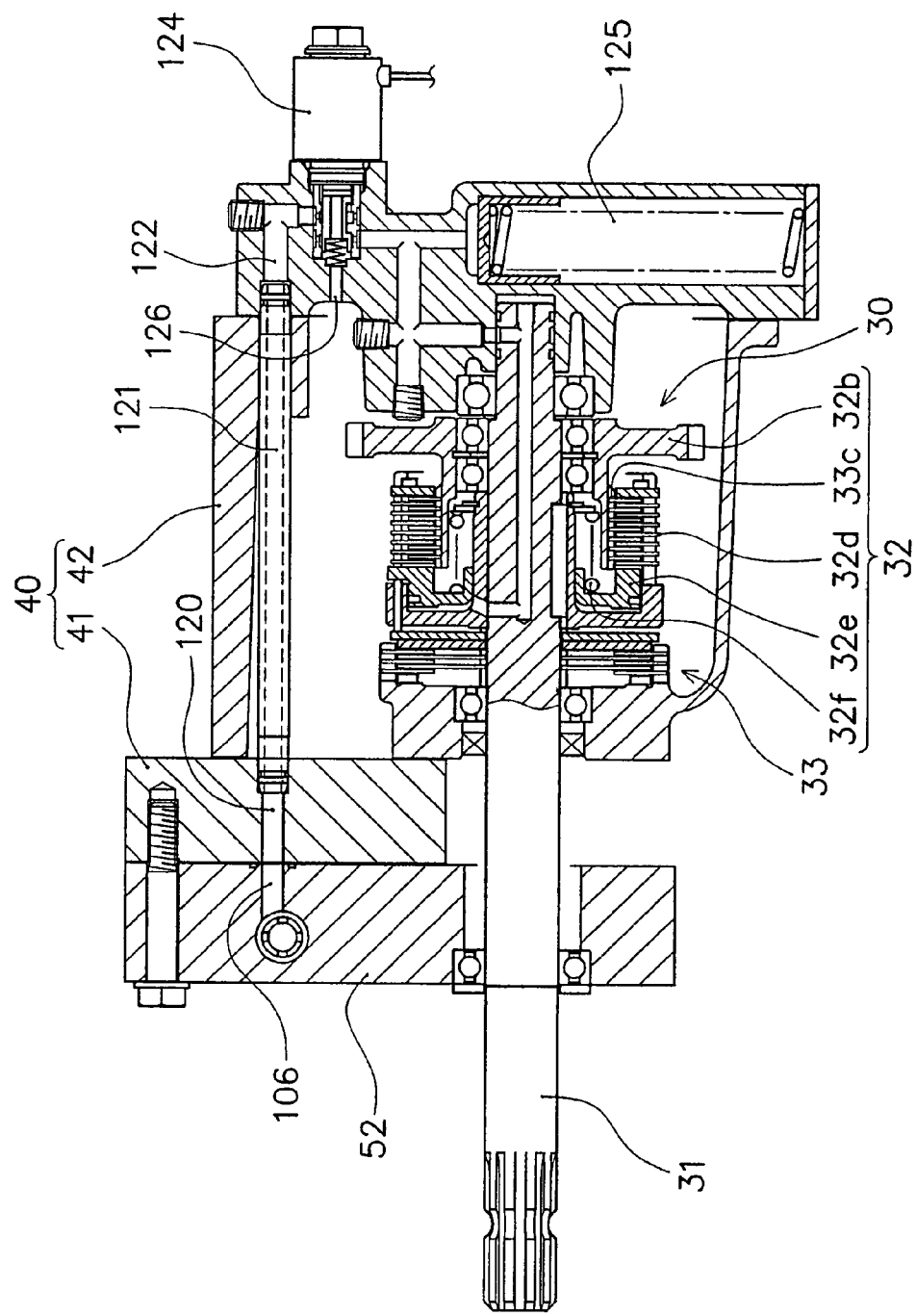
FIG. 4 is a cross-section taken along lines IV—IV in FIG. 3.

Embodiments of the HST for the vehicle according to the present invention will be hereinafter described with reference to the accompanying drawings. This embodiment will be described by taking for example the case that the vehicle, to which the HST is applied, has a front axle serving as a main driving axle, and is provided on the front side of the vehicle body with a working device in the form of a mower with an elevation function FIGS. 1 and 2 are respectively the power train model view and the hydraulic circuit diagram of the vehicle to which the HST is applied. FIG. 3 is the transverse plan view of the HST and FIG. 4 is the cross-section taken along lines IV—IV in FIG. 3.

As illustrated in those Figures, HST 1 is interposed in the drive-power transmission path between drive power source 300 and the driving axle (i.e., front axle 310 in this embodiment). That is, the HST 1 functions as one component of the power train for vehicle between power source 300 and the driving axle. The HST 1 includes hydraulic pump unit 10, hydraulic motor unit 20, PTO unit 30 and HST housing 40. The hydraulic pump unit 10 has pump shaft 11 extending in the fore-aft direction of the vehicle with an end away from the driving axle (rear end 11b in this embodiment) operatively connected to the drive power source 300. The hydraulic motor unit 20 has motor shaft 21 extending in the fore-aft direction of the vehicle and is designed to output the drive power through the motor shaft 21 whose speed is non-stepwisely varied in cooperation with the hydraulic pump unit 10. The PTO unit 30 has PTO shaft 31 extending in the fore-aft direction of the vehicle and operatively connected to the pump shaft 11. The HST housing 40 accommodates the hydraulic pump unit 10, hydraulic motor unit 20 and PTO unit 30.

The HST housing 40 has center section 41 adapted to support thereon the hydraulic pump unit 10 and the hydraulic motor unit 20 and forming therein a hydraulic circuit for hydraulic connection between both units 10, 20, and housing body 42 connected to the center section 41 so as to enclose the hydraulic pump unit 10, the hydraulic motor unit 20 and the PTO unit 30. In this embodiment, a pair of hydraulic lines 101 are employed as the hydraulic circuit formed in the center section 41.

In this embodiment as illustrated in FIG. 3, the center section 41 forms a part of the wall (front wall) of the HST housing 40 closer to the driving axle. This center section 41 may also be designed to form a wall (rear wall) away from the driving axle.

At least one of the hydraulic pump unit 10 and the hydraulic motor unit 20 is designed to be of a variable displacement type enabling the variation of the inflow/outflow amounts of hydraulic fluid. In this embodiment, the hydraulic pump unit 10 is of the variable displacement type, while the hydraulic motor unit 20 is of a fixed displacement type. In this respect, it is a matter of course to employ the arrangement with the hydraulic pump unit of the fixed displacement type and the hydraulic motor unit of the variable displacement type, or with both the units of the variable displacement type.

Figure 8:
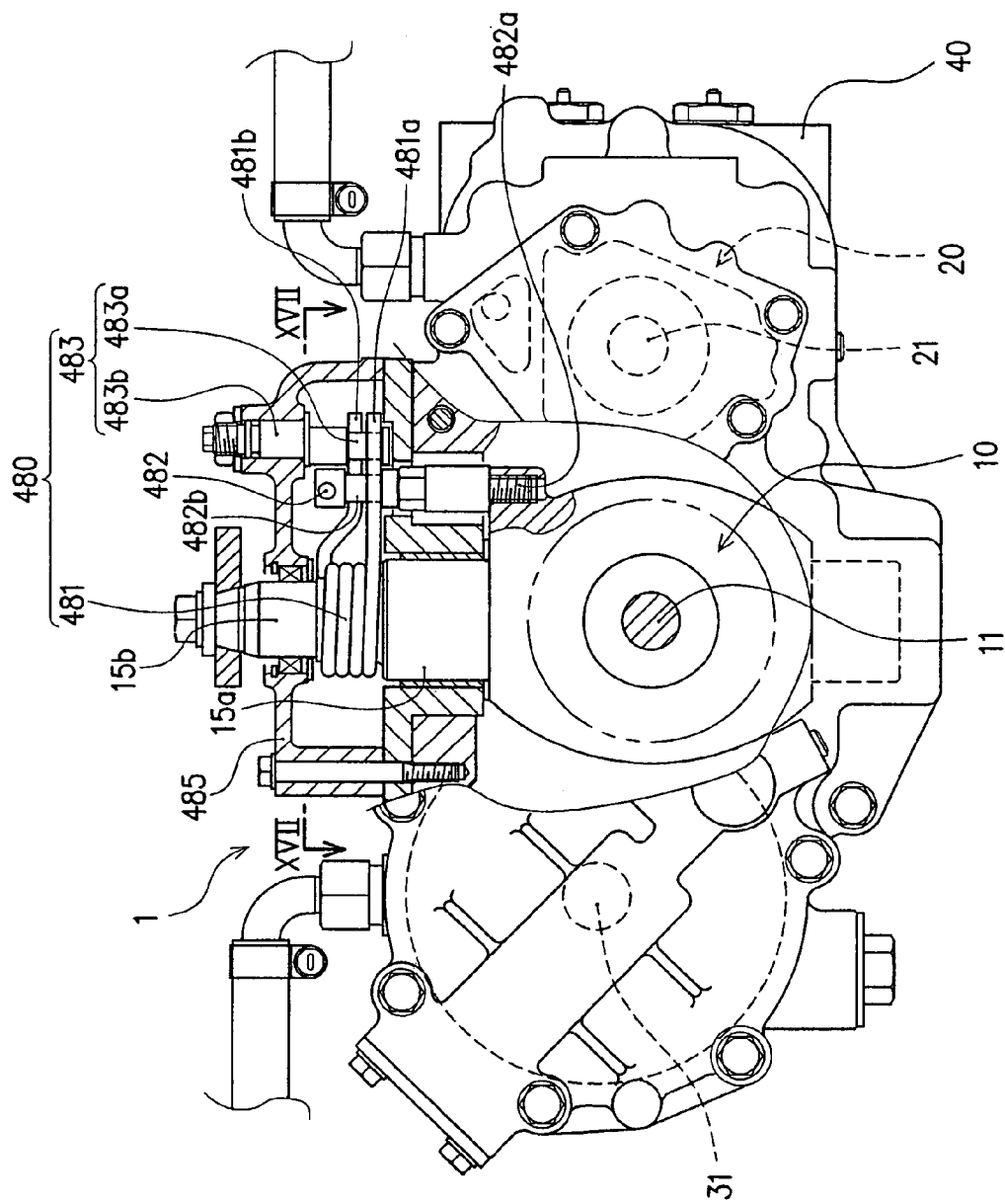
FIG. 8 is a view as viewed along lines VIII—VIII in FIG. 3.

The hydraulic pump unit 10 includes pump shaft 11, piston unit 12, cylinder block 13, output adjusting member 14, and control shaft 15 (see FIG. 8 and the other Figures). The pump shaft 11 has rear end 11b extending rearwards through the housing body 42 to be operatively connected with the power source 300 and front end 11a extending forwards through the center section 41. The piston unit 12 rotates around the axis of the pump shaft 11 as a result of the rotation of the pump shaft 11 and reciprocates in association with this rotation. The cylinder block 13 reciprocably supports the piston unit 12 while being supported by the center section 41 in such a manner as to be in communication with the pair of hydraulic lines 101. The output adjusting member 14 is designed to vary the amount of inflow/outflow by the piston unit 12 through limiting the stroke length of the piston unit 12 based upon its tilting position. The control shaft 15 is designed to adjust the tilting position of the output adjusting member 14.

Since this embodiment employs an axial piston type pump unit as the hydraulic pump unit 10, a movable swash plate is employed to function as the output adjusting member 14. Accordingly, where a radial piston type hydraulic pump unit is employed, a cam ring is employed as the output adjusting member.

The hydraulic motor unit 20 of the fixed displacement type includes cylinder block 23 that is supported on the center section 41 in such a manner as to be in communication with the pair of hydraulic lines 101, piston unit 22 that is slidably supported within the cylinder block 23, and reciprocable and rotatable by pressurized hydraulic fluid from the pair of hydraulic lines 101, and motor shaft 21 that is rotatable around the axis as a result of the rotation of the piston unit 22, thereby enabling the rotational output adjusted according to the output adjusting member 14 to be outputted through the motor shaft 21.

As illustrated in FIG. 1, the vehicle of this embodiment is provided with a mechanical transmission 320 as a transfer device for providing a wide range of speed change of the driving axle, in which the mechanical transmission 320 transfers the drive power between the HST 1 serving as the main speed change device and differential device 350 with front axle 310 serving as the main driving axle mounted therein. Because of this, the motor shaft 21 forwardly extends through the center section 41 to have forward end 21a connected to the mechanical transmission 320.

The mechanical transmission 320 may include for example driving shaft 321 that is connected to the motor shaft 21 in such a manner as to be relatively non-rotatable around the axis, clutch member 322 that is relatively non-rotatably and axially slidably supported on the driving shaft 321, idle gear 323 that is relatively rotatably supported on the driving shaft 321 and adapted to be selectively engaged with and disengaged from the clutch member 322 according to the axial slide of the clutch member 322, driven shaft 324 that is disposed parallel with the driving shaft 321, first driven gear 325 that is relatively non-rotatably supported on the driven shaft 324 to be meshed with the idle gear 323, second driven gear 326 that is relatively non-rotatably supported on the driven shaft 324, output shaft 327 that is disposed coaxially with the motor shaft 21 and operatively connected to the front axle 310 via the differential gear device 350, output gear 328 that is relatively non-rotatably supported on the output shaft 327 to be meshed with the second driven gear 326 and adapted to be selectively engaged with and disengaged from the clutch member 322 according to the axial slide of the clutch member 322, and casing 340 for accommodating these members.

According to the mechanical transmission 320 having the above arrangement, the clutch member 322 is selectively engaged with the output gear 328 or the driving gear 323, thereby providing two different rotational speed stages to the output shaft 327.

The mechanical transmission 320 is preferably provided with second PTO unit 330, as illustrated in FIG. 1.

The second PTO unit 330 may include for example counter shaft 331 disposed parallel with the driven shaft 324, PTO gear 332 that is relatively rotatably supported on the counter shaft 331 to be meshed with the first driven gear 325, second PTO clutch member 333 that is selectively engaged with and disengaged from the PTO gear 332, and second PTO shaft 334 that relatively non-rotatably supports the second PTO clutch member 333 and has a rear end extending rearwards.

The second PTO unit 330 provided can easily take off the drive-power synchronized with the front axle 310 serving as the main driving axle. Therefore, in the cases such as that a rear axle (not shown) besides the front axle 310 is to be driven, it is possible to constantly rotate these axles synchronously to each other without necessity of a complicated transmission mechanism.

Figure 10:
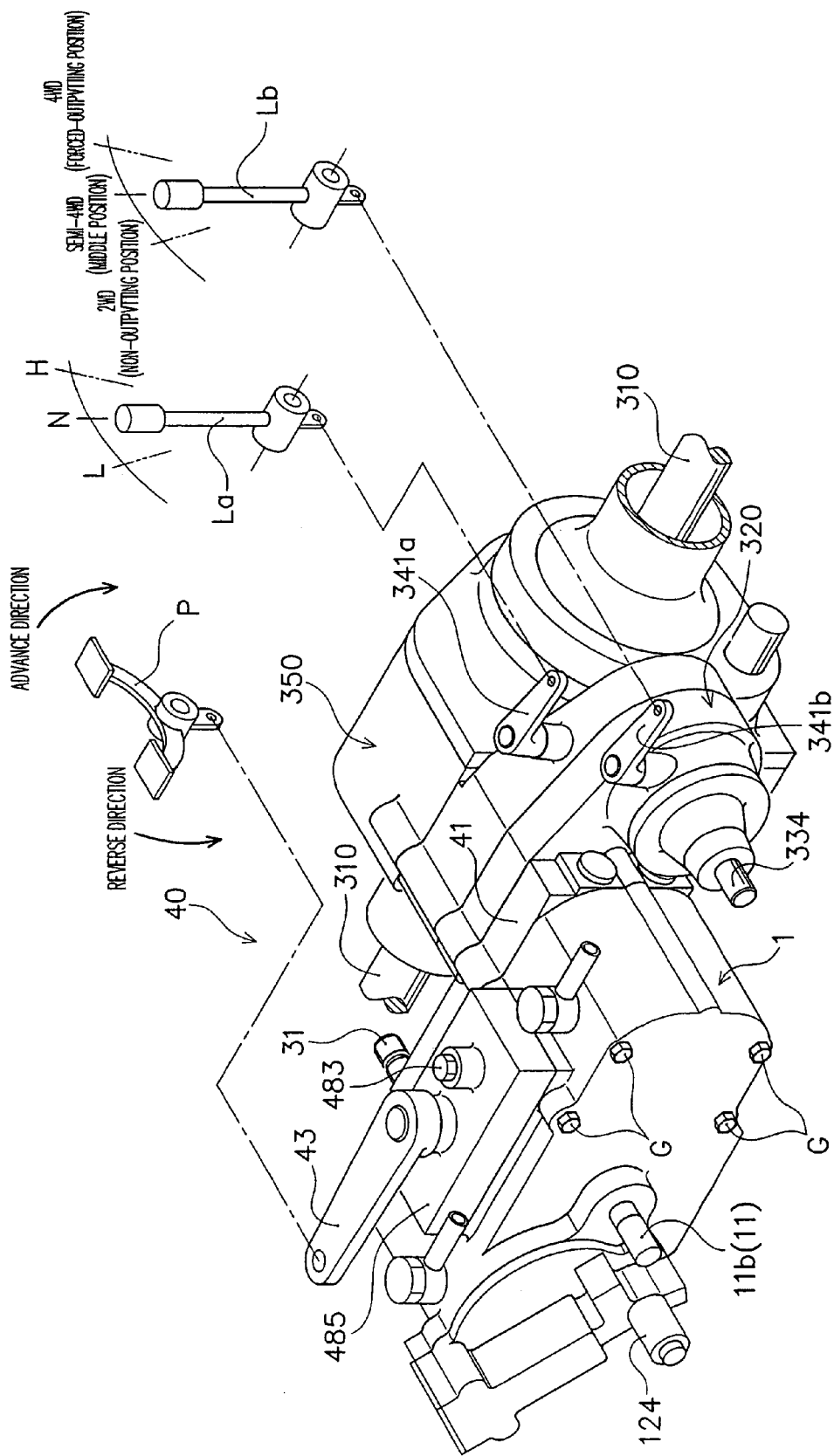
FIG. 10 is a perspective view of the HST, the mechanical transmission and a front axle as viewed obliquely from behind.

The mechanical transmission serving as a transfer device between the HST and the differential device will be hereinafter described in more detail. FIG. 10 is a perspective view of an area extending from the HST 1 to the front axle 310 as viewed obliquely from behind.

As illustrated in FIG. 10, the mechanical transmission 320 is provided on an upper portion thereof with range shift arm 341a for shifting the clutch member 322 of the mechanical transmission 320, and shifting arm 341b for the shifting the second PTO clutch member 333. The range shift arm 341a and the shifting arm 341b are coupled respectively to manipulating members mounted on a driver's stand such as mechanical transmission manipulating lever La and second PTO unit manipulating lever Lb.

A reference code 43 in FIG. 10 represents speed change arm 43 for tilting and rotating the output adjusting member of HST 1. The speed change arm 43 has a first end connected to speed change pedal P or any other manipulation member on the driver's stand via a wire or the like and a second end connected to the output adjusting member 14. Accordingly, the speed change arm is rotated in response to the operator's manipulation of the manipulation member, thereby tilting and rotating the output adjusting member.

Figure 11:
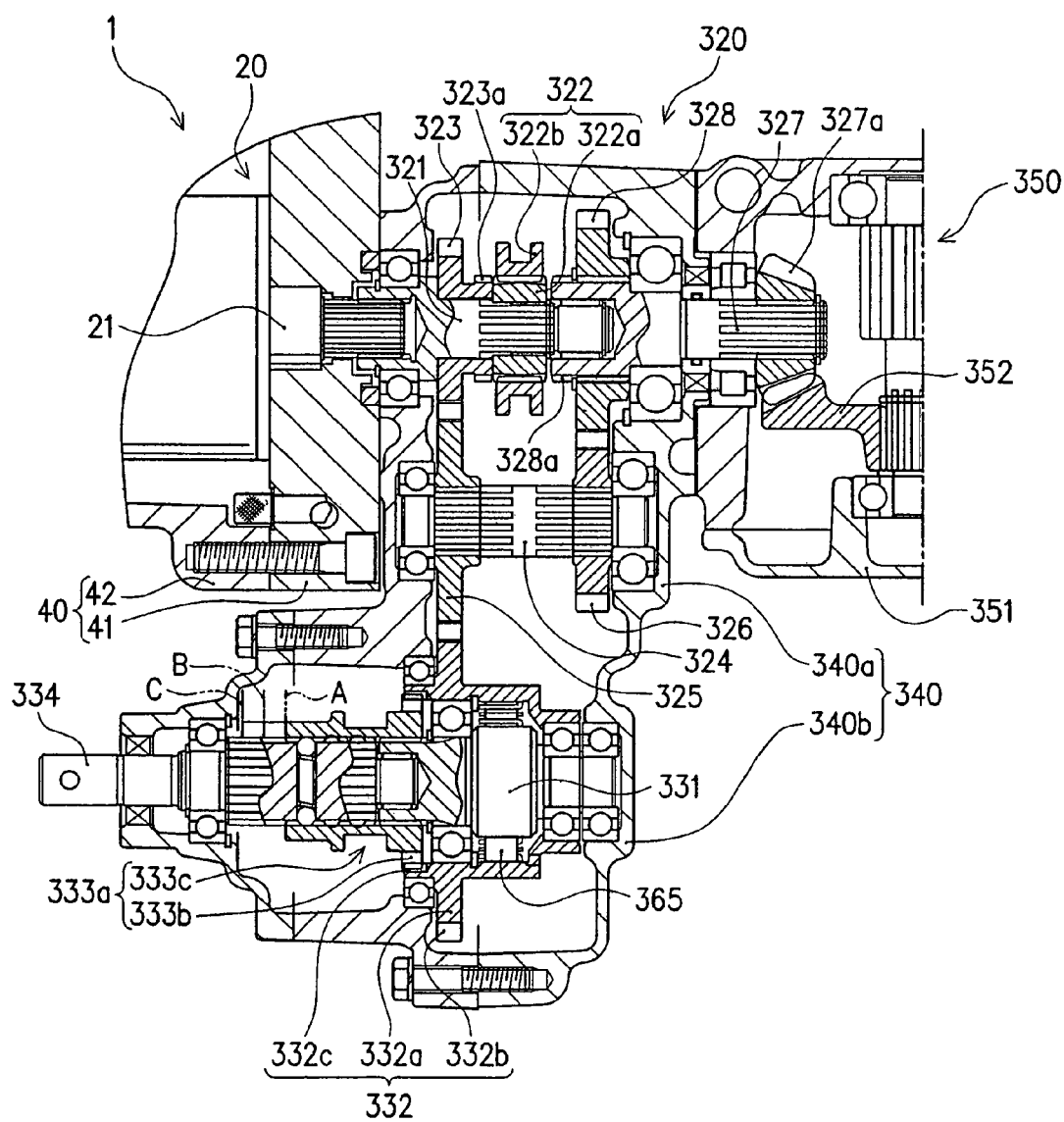
FIG. 11 is a cross-section of the mechanical transmission taken along the drive-power transmission path of the mechanical transmission.
Figure 12:
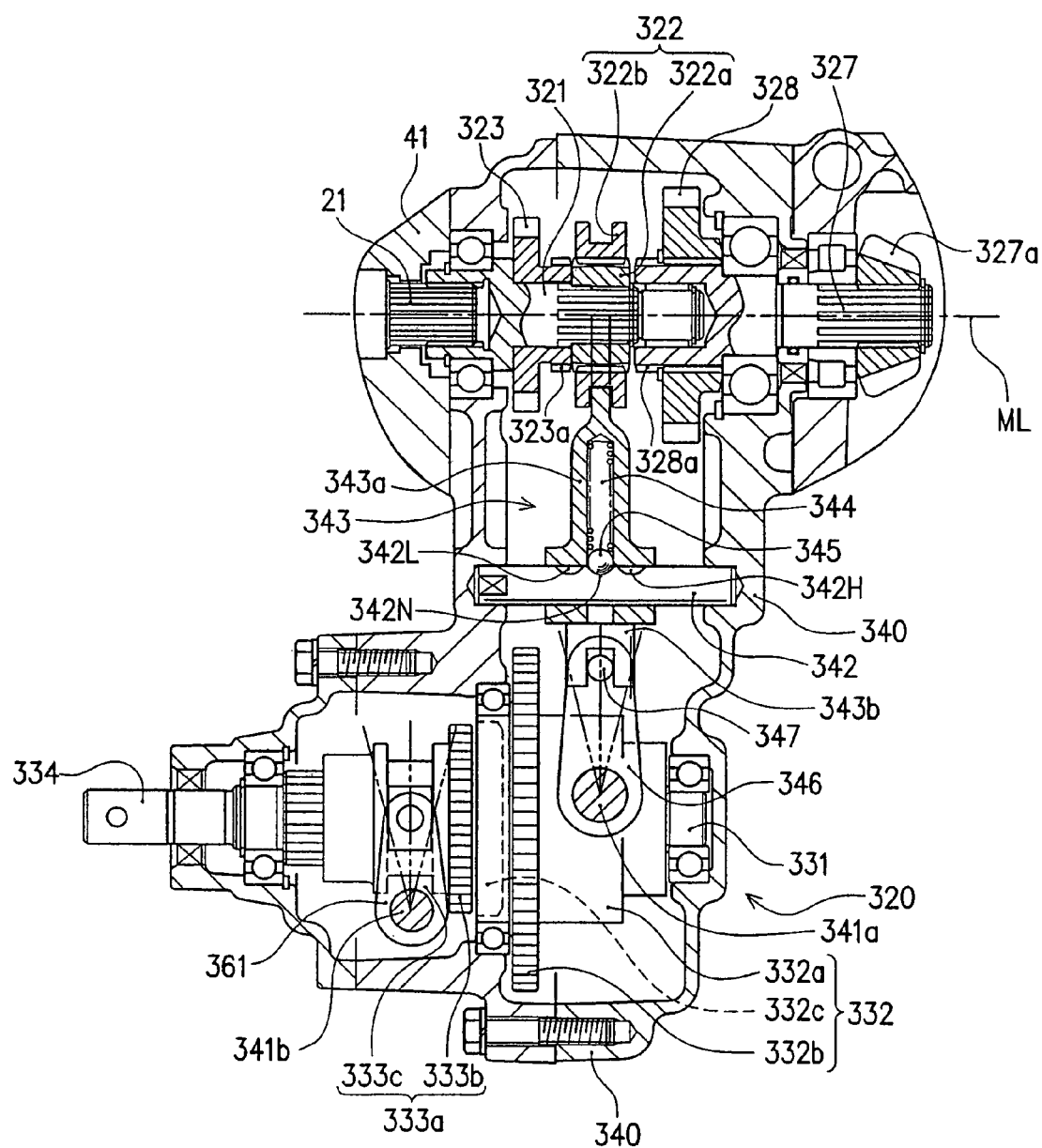
FIG. 12 is a cross-section of the mechanical transmission including a moving part of its range-shift arm.
Figure 13:
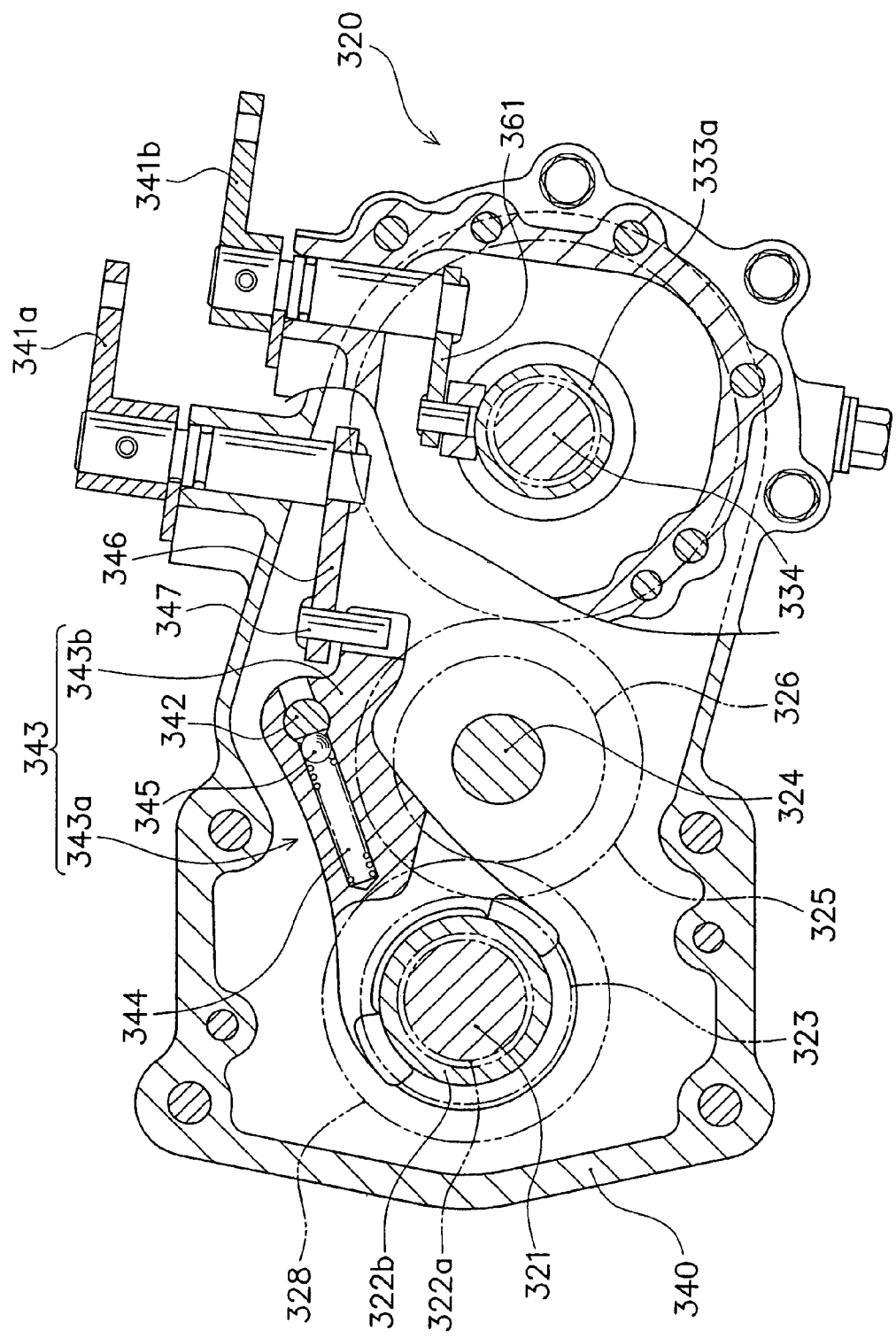
FIG. 13 is a longitudinal cross-section of the mechanical transmission with its stepped cross-section as viewed from behind.

FIGS. 11 and 12 illustrate cross sectional plan views of the mechanical transmission 320. Specifically, FIGS. 11 and 12 are cross-section taken along the drive-power transmission path of the mechanical transmission 320, and cross-section including a moving part of the range shift arm 341a. FIG. 13 is a longitudinal cross-section of the mechanical transmission 320 with its stepped cross-section as viewed from behind.

The mechanical transmission 320 is detachably interconnected between the HST 1 and the differential device 350.

Specifically, the casing 340 of the mechanical transmission 320 is designed to be detachably interconnected to the HST housing 40 of the HST 1 and differential housing 351 of the differential device 350, respectively.

In the arrangement with the mechanical transmission 320 removed, it is possible to couple the motor shaft 21 of the HST 1 to the differential device 350. That is, the output shaft 327 of the mechanical transmission 320 is disposed coaxially with the motor shaft 21 of the HST 1 (hereinafter referred to main drive-power transmission axis (ML)), so that the motor shaft 21 can be directly connected to the differential device 350 in the arrangement with the mechanical transmission removed.

Specifically, when mounting the mechanical transmission 320, four elongated bolts G are screwed into the front side of the differential housing 351 of the differential device 350, passing the HST housing 40 and the casing 340 of the mechanical transmission 340, so that they are interconnected (see FIG. 10). In this manner of use, the driving shaft 321 of the mechanical transmission 320 is connected to the motor shaft 21 of the HST 1 in such a manner as to be relatively non-rotatable with respect to the axis, while the output shaft 327 of the mechanical transmission 320 is connected to power input part 352 of the differential device 350 via bevel gear 327a.

Figure 14:
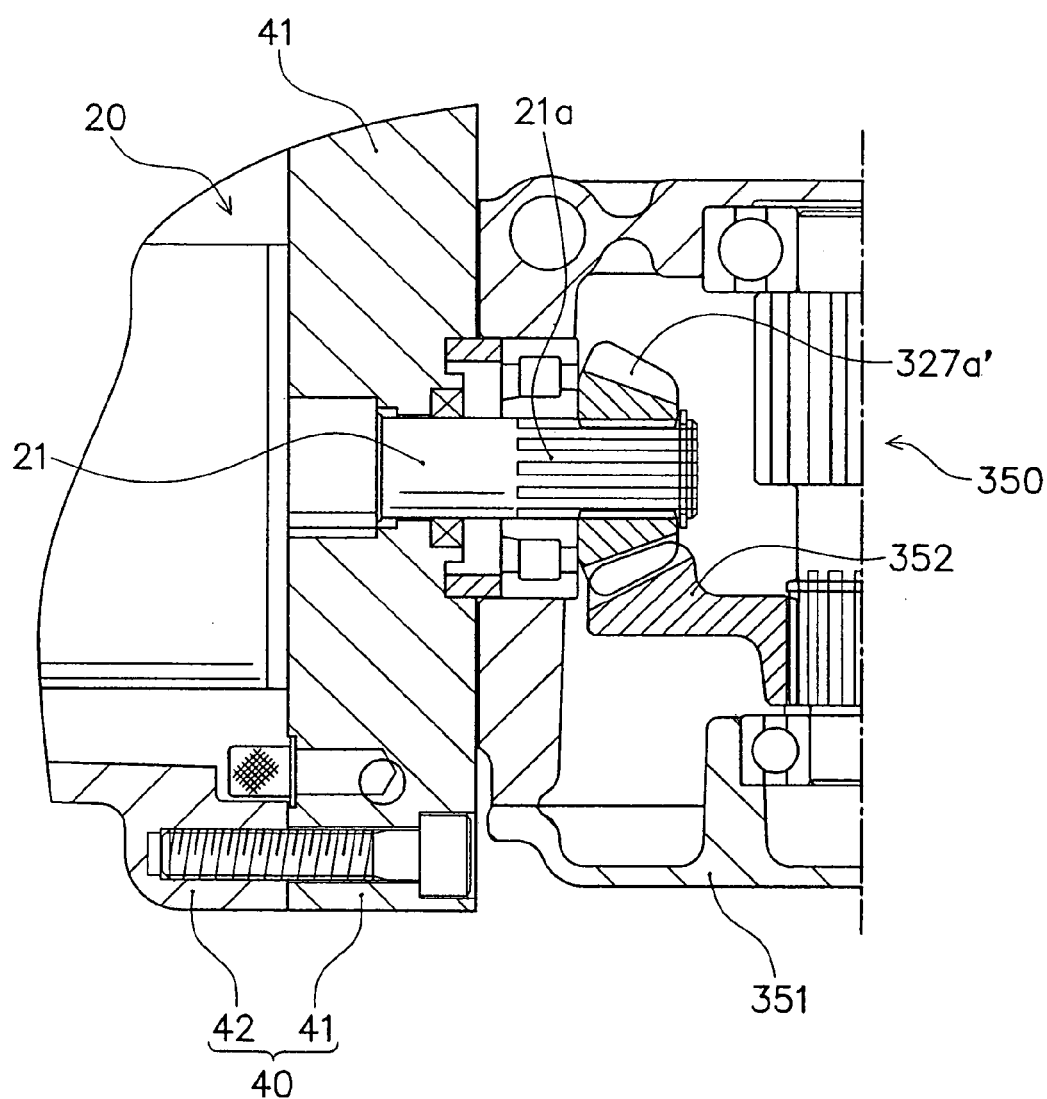
FIG. 14 is a cross-section with the mechanical transmission removed and the HST directly connected to a differential gear device.

On the other hand, when the mechanical transmission 320 is out of use, the HST 1 can be connected directly to the differential device 350 of the HST 1. In this manner of use, the motor shaft 21 of the HST 1 is connected to the power input part 352 of the differential device via bevel gear 327a' having the same arrangement as the bevel gear 327a (see FIG. 14).

The casing 340 includes body 340a that supports the driving shaft 321, the output shaft 327 and the driven shaft 324, and extension 340b that extends from the body 340a and past the HST 1 in the direction perpendicular to the main drive-power transmission axis ML. The second PTO shaft 334 is supported on this extension 340b. This arrangement can simplify the power train between the second PTO shaft 334 and the subsequent members.

The shifting operation of the mechanical transmission 320 will be hereinafter described in more detail.

As illustrated in FIG. 11, the driving shaft 321 is disposed coaxially with the motor shaft 21 and connected thereto in such a manner as to be relatively non-rotatable with respect to the axis. An end of the driving shaft 321 is relatively rotatably positioned in the rear side of the output shaft 327. That is, the output shaft 327 is disposed coaxially with the driving shaft 321, and loosely supported for the relative rotation with respect to the axis.

The clutch member 322 is relatively non-rotatably and axially slidably supported on the driving shaft 321 between the idle gear 323 relatively rotatably supported on the driving shaft 321 and the output gear 328 relatively non-rotatably supported on the output shaft 327.

More specifically, the clutch member 322 includes spline hub 322a that is relatively non-rotatably fitted around the driving shaft 321, and sleeve 322b that is relatively non-rotatably and axially slidably fitted around the spline hub 322a.

The idle gear 323 and the output gear 328 respectively have engaging elements 323a and 328a on portions adjacent to the spline hub 322a with the same pitch as that of a spline formed on the outer circumference of the spline hub 322a.

Accordingly, through the axial sliding motion of the sleeve 322b, it can take a position enabling engagement with the spline hub 322a only (hereinafter referred to neutral position), a position enabling engagement with both the spline hub 322a and the engaging element 323a (hereinafter referred to low speed position), and a position enabling engagement with the spline hub 322a and the engaging element 328a (hereinafter referred to high speed position).

More specifically, the idle gear 323 and the first driven gear 325 each have a particular number of teeth (pitch circle diameter) set so that the rotational speed of the driving shaft 321 is reduced at predetermined speed reducing ratio R and transmitted to the driven shaft 324. Also, the second driven gear 326 and the output gear 328 each have a particular number of teeth set so that the rotational speed of the driven shaft 324 is reduced at predetermined speed reducing ratio R and transmitted to the output shaft 327.

That is, the number of teeth of each gear is set so that the speed reducing ratio of the first driven gear 325 with respect to the idle gear 323 and that of the output gear 328 with respect to the second driven gear 326 are: R.

With the sleeve 322b at the low speed position, the drive power of the driving shaft 321 is transmitted to the output shaft 327 via the idle gear 323, first driven gear 325, driven shaft 324, second driven gear 326 and output gear 328. Therefore, when the rotational speed of the driving shaft 321 is: V, the output shaft 327 is rotated at a rotational speed of $V/R^2$.

On the other hand, with the sleeve 322b at the high speed position, the driving shaft 321 is directly connected to the output shaft 327 with the sleeve 322b. Therefore, when the rotational speed of the driving shaft 321 is: V, the output shaft 327 is also rotated at a rotational speed of V.

The description of the operation mechanism of the sleeve 322b will be hereinafter made with reference mainly to FIGS. 12 and 13.

As illustrated in FIG. 12, supporting shaft 342 parallel with the main drive power transmission axis ML is supported on the casing 340, on which selector fork 343 is axially slidably supported. The selector fork 343 includes driving part 343a and passive part 343b that extend away from each other in the radial direction from the connected portion with the supporting shaft 342. The driving part 343a has an end engaged with the sleeve 322b. The driving part 343a forms therein a hollowed portion with a closed end. The hollowed portion with the closed end opens to a through-hole, through which the supporting shaft 342 extends, and extends in the direction orthogonal to the through-hole. The hollowed portion is provided therein with ball 345 and helical compression spring 344 that biases the ball 345 towards the supporting shaft 342. The supporting shaft 342 forms thereon dished recesses 342L, 342N, 342H along a direction from the idle gear 323 to the output gear 328 respectively for receiving the ball 345. The ball 345 engages with either recess to prevent unexpected movement of the selector fork 343, and retreats to the inside of the hollowed portion against the biasing force of the spring 344 when the selector fork 343 is forced to slide on the supporting shaft 342. The ball 345 is then positioned on a different recess of those recesses with the biasing force of the spring 344 to prevent the unexpected movement of the selector fork 343.

The range shift arm 341a above the casing 340 has a rotational shaft extending into the casing 340. A driving arm 346 is connected to an extended portion of the rotational shaft inside of the casing. The driving arm 346 extends in the direction orthogonal to the rotational shaft and has an end engaging with the passive part 343b.

More specifically, the passive part 343b has a U-shape with an open end, and is connected to the driving arm 346 via an engaging pin 347 positioned between the legs of the U-shaped passive part 343b. With this arrangement, the rotational shaft is rotated around the axis thereof by the rotation of the range shift arm 341a around the rotational shaft, so that the driving arm 346 is rotated around the rotational shaft. This rotation of the driving arm 346 allows the passive part 343b (selector form 343) to slide along the supporting shaft 342.

Thus, the sliding movement of the selector fork 343 along the supporting shaft 342 causes the movement of the sleeve 322b engaged with the selector fork 343, which enables the sleeve to take the neutral position, low speed position or high speed position. More specifically, when the ball 345 engages with each of the recesses 342L, 342N, 342H of the supporting shaft 342, the sleeve 322b correspondingly takes the low speed position enabling the engagement with both the spline hub 322a and the engaging element 323a, neutral position enabling the engagement with the spline hub 322a only, and high speed position enabling the engagement with both the spline hub 322a and the engaging element 328a.

Now, the description of the second PTO unit 330 will be made in more detail with reference mainly to FIGS. 11 and 12.

As illustrated in FIG. 11, the counter shaft 331 and the second PTO shaft 334 are disposed coaxially with each other in such a manner as to be relatively rotatable with each other around the axis.

The PTO gear 332 includes cylindrical body 332a supported on the counter shaft 331 via one-way clutch 365. The cylindrical body 332a is provided thereon with external gear portion 332b that is meshed with the first driven gear 325 and internal gear portion 332c.

The second PTO clutch member 333 includes cylindrical slider 333a that is relatively non-rotatably and axially slidably supported on the counter shaft 331 and the second PTO shaft 334. Specifically, the slider 333a has an internal gear portion that is meshed with a spline provided on the each-other-facing portions of the counter shaft 331 and the second PTO shaft 334, so that it can take a position enabling the engagement with both the counter shaft 331 and the second PTO shaft 334, and a position enabling the disengagement from the counter shaft 331.

The slider 333a also has external gear portion 333b that is engaged with the internal gear portion 332c of the cylindrical body 332a, and annular groove 333c for axial sliding of the slider in the axial direction.

The shifting arm 341b has a rotational shaft extending into the casing 340. A driving arm 361 is connected to an extended portion of the rotational shaft inside of the casing. The driving arm 361 extends in the direction orthogonal to the rotational shaft and has an end engaging with the annular groove 333c of the slider 333a.

Accordingly, the rotation of the shifting arm 341b around the rotational shaft causes the rotation of the rotational shaft around the axis, and hence the rotation of the driving arm 361 around the rotational shaft. Thus, the slider 333a slides along the counter shaft 333a and the second PTO shaft 334 in response to the rotation of the driving arm 361.

Now, the description of the shifting action of the second PTO unit 330 will be described in more detail.

Firstly, with the slider 333a at position A illustrated in FIG. 11, the drive power is transmitted from the first driven gear 325 to the second PTO shaft 334 via the second PTO gear 332 and the slider 333a. That is, with the slider 333a at the position illustrated in FIG. 11, the second PTO unit 330 is drawn into a forcible output mode.

Secondly, with the slider 333a at position B illustrated in FIG. 11, the second PTO gear 332 is released from engaging relationship with the slider 333a, while the counter shaft 331 is brought into connection with the second PTO shaft 334 via the slider 333a in such a manner to be relatively non-rotatable around the axis. As described above, the second PTO gear 332 is supported on the counter shaft 331 via the one-way clutch 365. Accordingly, with the slider 333a at the position B, semi-output mode becomes effective, enabling the interruption of the transmission of the drive power from the second PTO gear 332 to the counter shaft 331 in the case where the rotation number of the second PTO shaft 334 exceeds that of the second PTO gear 332.

Lastly, with the slider 333a at position C illustrated in FIG. 11, the slider 333a is disengaged from the counter shaft 331. Accordingly, non-output mode becomes effective, enabling non-output of the drive power through the second PTO shaft 334.

When the drive power for the rear wheels is to be taken off through the second PTO shaft 334, the second PTO shaft 334 is preferably rotated in synchronization with the output shaft 327. For this purpose, the following arrangement is employed in this embodiment. That is, the transmission ratio from the driven shaft 324 to the counter shaft 331 or the second PTO shaft 334 is set to be the same as the transmission ratio from the driven shaft 324 to the output shaft 327.

Specifically, the second PTO gear 332 is designed so that the speed reducing ratio of the second PTO gear 332 with respect to the first driven gear 325 can be the same as the speed reducing ratio R of the output gear 328 with respect to the second driven gear 326. Thereby, the second PTO shaft 334 is rotated in synchronization with the output shaft 327 regardless of the shifting state of the mechanical transmission 320.

That is, with the mechanical transmission 320 in a low speed state or with the sleeve 322b at the low speed position, the driven shaft 324 is rotated at a speed of V/R via the idle gear 323 and the first driven gear 325 when the driving gear 321 is rotated at a rotational speed of V. The output shaft 327 is also rotated at a speed of $V/R^2$ via the second driven gear 326 and the output gear 328. At this moment, the second PTO gear 332 has a gear ratio of R with respect to the first driven gear 325, so that the second PTO gear 332 is rotated at a speed of $V/R^2$ likewise the output shaft 327.

With the mechanical transmission 320 in a high speed state or with the sleeve 322b at the high speed position, the output shaft 327 is rotated at a speed of V that is the same as the rotational speed of the driving shaft 321. The driven shaft 324 is also rotated at a speed of R×V via the output gear 328 and the second driven gear 326. At this moment, the second PTO gear 332 has a gear ratio of R with respect to the first driven gear 325, so that the second PTO gear 332 is rotated at a speed of V likewise the output shaft 327.

In this embodiment, the second PTO shaft 334 is thus rotated in synchronization with the output shaft 327 regardless of the shifting state of the mechanical transmission.

The second PTO gear 332 is meshed with the first driven gear 325 in this embodiment. However, the present invention is not necessarily limited to this embodiment. Rather, various embodiments can be employed as far as the speed change ratio from the driven shaft 324 to the counter shaft 331 or the second PTO shaft 334 is the same as the speed change ratio from the driven shaft 324 to the output shaft 327. For example, it is possible to employ an arrangement that enables the second PTO gear 332 to be meshed with the second driven gear 326.

In the above description, the mechanical transmission 320 that is capable of selectively performing speed-change-and-power-transmission/power-shutdown between the HST 1 and the differential device is employed as the transfer device between the HST 1 and the differential device. However, the present invention is not necessarily limited to this embodiment.

Figure 15:
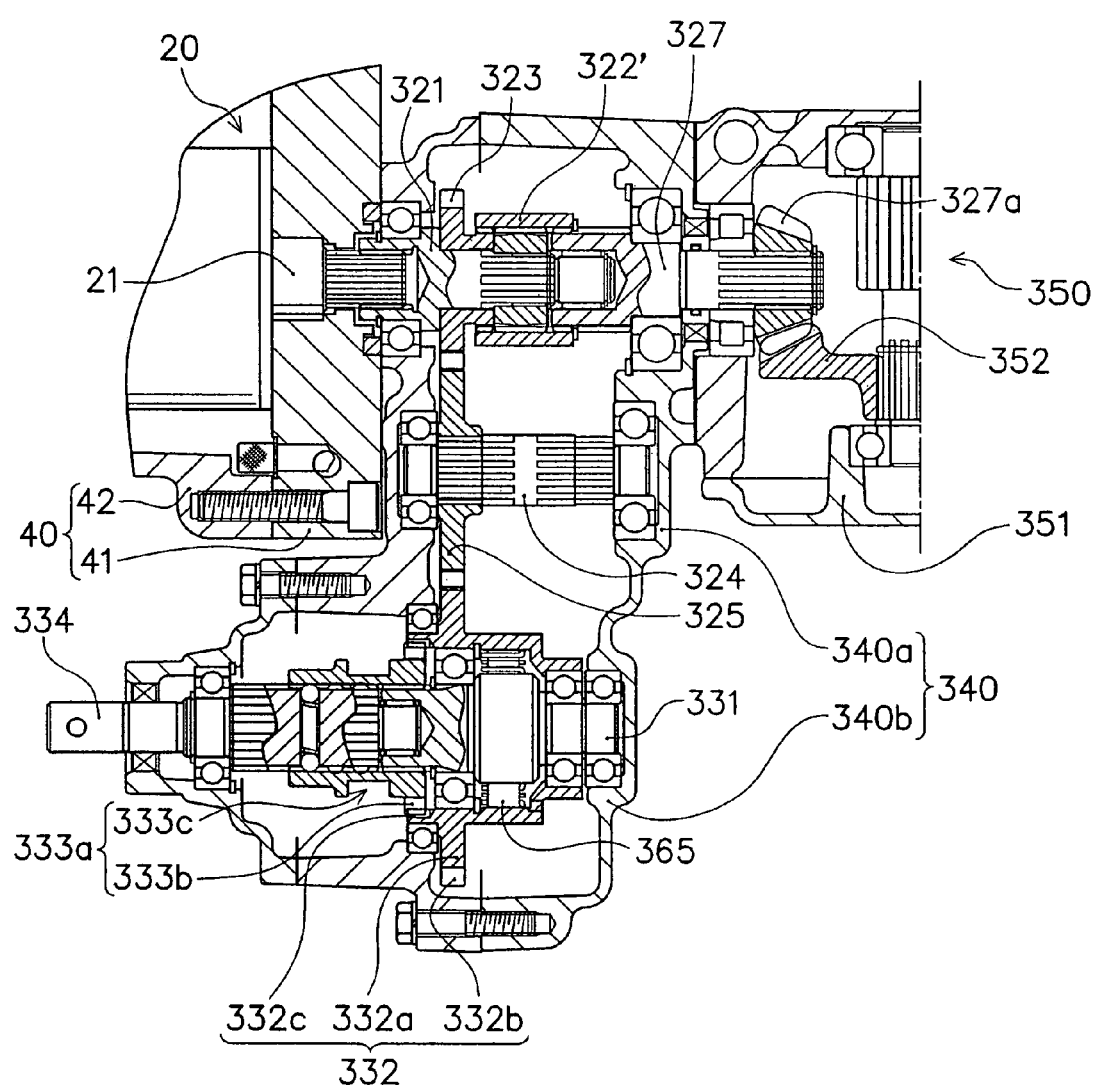
FIG. 15 is a cross-section with the drive-power transmission equipped with the PTO unit mounted in replacement of the mechanical transmission.

For example, where the speed change between the HST and the differential device is not needed, a constant speed transmission device may be employed as the transfer device, as illustrated in FIG. 15. In the following description on the constant speed transmission device illustrated in FIG. 15, same or identical parts to those of the mechanical transmission 320 have been given the same reference characters to omit a detailed description thereof.

As illustrated in FIG. 15, in the constant speed transmission device, the driving shaft 321 and the output shaft 327 are coupled to each other via cylindrical coupling member 322' in such a manner as to be constantly non-rotatable with respect to each other around the axis.

The drive power to the second PTO gear is transmitted from the driving shaft 321 via the idle gear 323 and the first driven gear 325. Each gear is set so that the second PTO shaft is rotated in synchronization with the output shaft.

Specifically, it is possible to employ the arrangement with the idle gear 323, the first driven gear 325 and the second PTO gear 332 all having the same number of teeth, or the arrangement with the first driven gear 325 designed to increase or decrease the speed at a predetermined speed change ratio with respect to the idle gear and the second PTO gear 332 designed to increase or decrease the speed at the same speed change ratio as the predetermined speed change ratio with respect to the first driven gear 325.

Now, the description of the PTO unit 30 will be made. The PTO unit 30 includes PTO shaft 31 that is disposed in the fore-aft direction of the vehicle and has front end 31a extending forwardly through the front wall of the HST housing 40, and hydraulic clutch device 32 that is designed for on/off of the drive power transmission from the pump shaft 11 to the PTO shaft 31.

The hydraulic clutch device 32 includes first gear 32a that is relatively non-rotatably supported on the pump shaft 11, driving gear member 32b that is relatively rotatably supported on the PTO shaft 31 to be meshed with the first gear 32a, driving-side clutch plate 32c that is relatively non-rotatably and axially non-slidably supported on the driving gear member 32b, driven-side clutch plate 32d that is disposed opposite to the driving-side clutch plate 32c, pressing member 32e that is relatively non-rotatably and axially slidably supported on the PTO shaft 31 in such a manner as to relatively non-rotatably support the driven-side clutch plate 32d and bring the same into engagement with the driving-side clutch plate 32c by the effect of hydraulic pressure, and biasing member 32f that biases the pressing member 32e in such a manner as to move the driven-side clutch plate 32d away from the driving-side clutch plate 32c. According to this arrangement, the PTO shaft 31 is rotated in synchronization with the pump shaft 11 upon receiving the effect of the hydraulic pressure.

Brake device 33 is preferably provided to apply braking power on the PTO shaft 31 in association with power shutdown action of the hydraulic clutch device 32 to the PTO shaft 31. The brake device 33 provided can effectively prevent the PTO shaft 31 from rotating with the moment of inertia effected by the working device connected to the PTO shaft 31 when shutting down the drive power transmission to the PTO shaft 31.

The HST 1 according to this embodiment additionally includes charge pump unit 50 for feeding pressurized hydraulic fluid to the pair of hydraulic lines 101.

The charge pump unit 50 includes charge pump body 51 of a trochoid gear type that is supported on front extension 11a of the pump shaft 11, and charge pump case 52 that is connected to a wall of the HST housing 40 closer to the driving axle, enclosing the charge pump body 51. In this embodiment, the center section 41 corresponds to this wall.

The charge pump case 52 includes center portion 52a that forms therein a hereinafter described hydraulic line communicated with an inlet port and an outlet port of the charge pump body 51, and projection 52b that projects from the center portion 52a and extends in the vehicle width direction towards the outside. The projection 52b is designed to provide bearing support for the front end 31a of the PTO shaft 31.

By providing the bearing support for the front end 31a of the PTO shaft 31 through the charge pump case 52, the following effects can be provided.

Figure 9B:
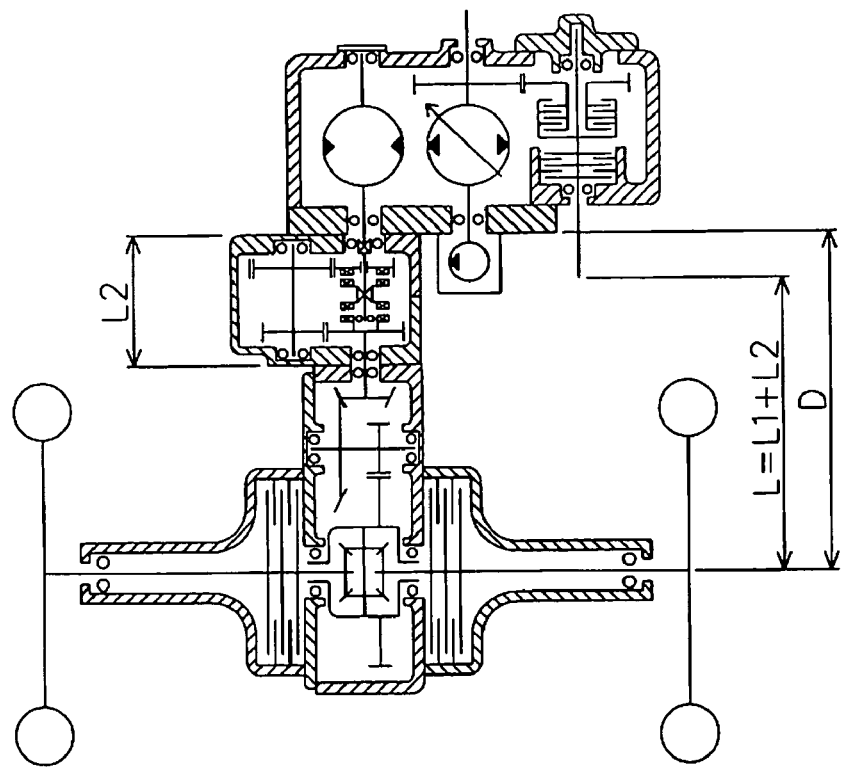
FIG. 9(b) is the model view illustrating a power train between the drive power source and the driving axle (front axle) in which the HST with the PTO unit and the mechanical transmission are interposed.
Figure 9A:
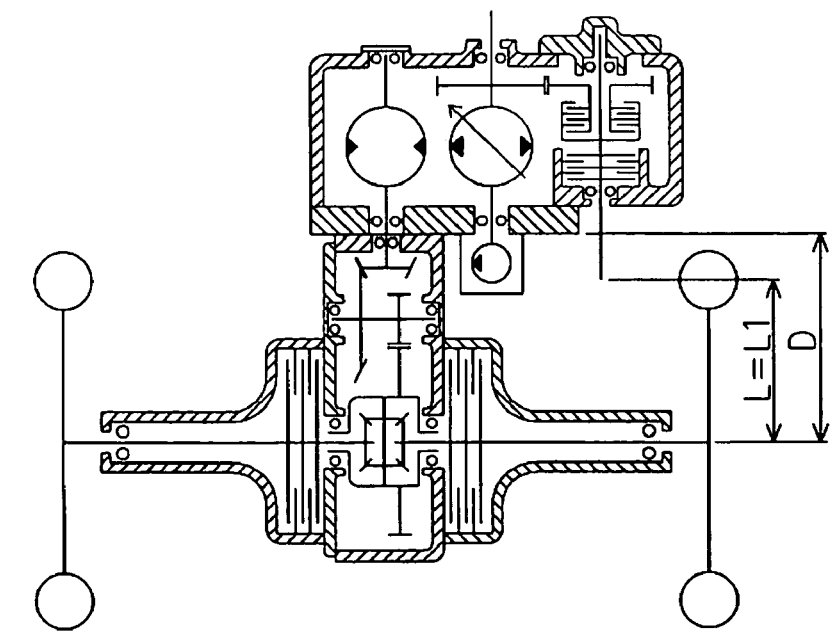
FIG. 9(a) is the model view illustrating a power train in the arrangement that a conventional HST with a PTO unit is applied to a vehicle that has a front axle serving as a driving axle and is provided on the front side of the vehicle with a working device such as a mower.

In comparison with distance D (i.e., the distance between the front wall of the HST housing and the driving axle) in the arrangement with the mechanical transmission interposed between the HST and the driving axle (FIG. 1) and the distance D in the arrangement without the mechanical transmission (FIG. 9a), the former is longer than the latter by L2 of the length of the mechanical transmission 320 with respect to the fore-aft direction of the vehicle.

Therefore, in order to have the distance between the driving axle and the front end of the PTO shaft constant in the respective arrangements, it is necessary to have the front end of the PTO shaft further extending towards the front side of the vehicle from the HST housing. However, simply extending the front end of the PTO shaft may result in rotational deflection of the PTO shaft or the like.

On the contrary, in this embodiment, since the front end 31a of the PTO shaft 31 is bearing-supported by the charge pump case 52, the rotational deflection can effectively be prevented even in the arrangement with the front end 31a of the PTO shaft 31 further extending from the HST housing 40.

In this embodiment, the HST is designed so that the front end 31a of the PTO shaft 31 can be supported by the HST only. Specifically, the front end 31a of the PTO shaft 31 is supported by the charge pump case 52 that is a constituent member of the HST 1, so that improved assembling efficiency is obtainable as compared with the arrangement with the front end of the PTO shaft supported by a separate member such as a vehicle body other than the HST.

Figure 5:
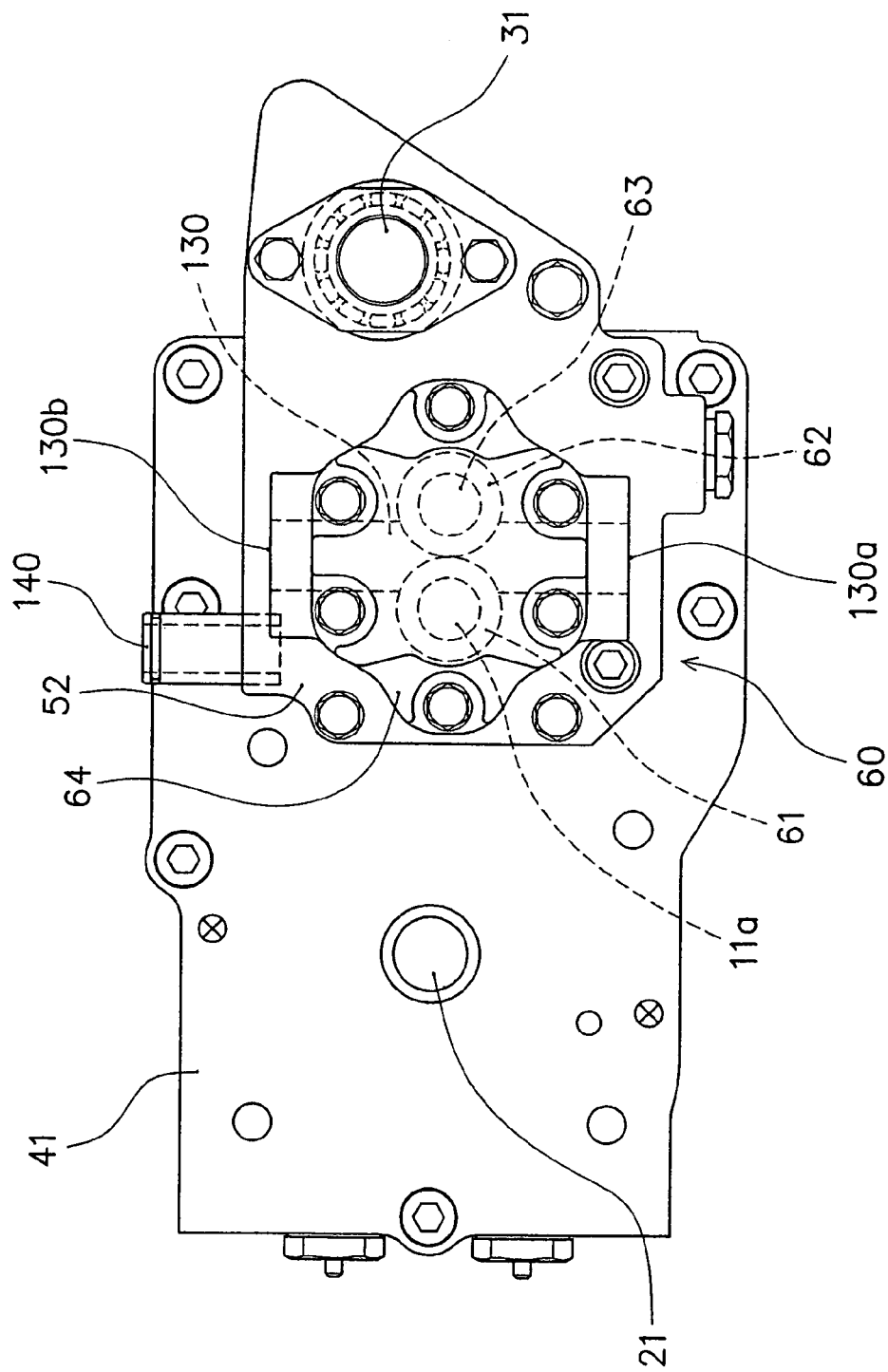
FIG. 5 is a view as viewed along lines V—V in FIG. 3.

The HST 1 having the above arrangement preferably includes auxiliary pump unit 60 of an external gear type that is detachably mounted thereon. FIG. 5 is a view as viewed along lines V—V in FIG. 3.

As illustrated in FIGS. 3 and 5, the auxiliary pump unit 60 may include first pump gear 61 that is relatively non-rotatably supported on a portion of the front end 11a of the pump shaft 11, which portion forwardly extends from the charge pump case 52, second pump gear 62 that is meshed with the first pump gear 61, idle shaft 63 that supports thereon the second pump gear 62, and auxiliary pump case 64 that is connected to the charge pump case 52, enclosing the first and second pump gears 61, 62.

By providing the auxiliary pump unit 60, it is possible to provide a sufficient amount of pressurized hydraulic fluid according to the specification of each vehicle without applying an excessive load on the charge pump unit 50. Specifically, where the vehicle is designed to enable the mower to elevate, and/or where a power steering device is provided for the steering wheels, the auxiliary pump unit 60 provided can make the charge pump unit 50 available for feeding the pressurized hydraulic fluid to the pair of hydraulic lines 101 and the hydraulic clutch device 32 in the PTO unit 30, and make the auxiliary pump unit 60 available for feeding the pressurized hydraulic fluid to the mower elevation device and/or the power steering device, thereby preventing excessive load to the charge pump unit 50, while providing a sufficient amount of the pressurized hydraulic fluid.

The description will be hereinafter made for the hydraulic circuit of the HST 1.

Figure 6:
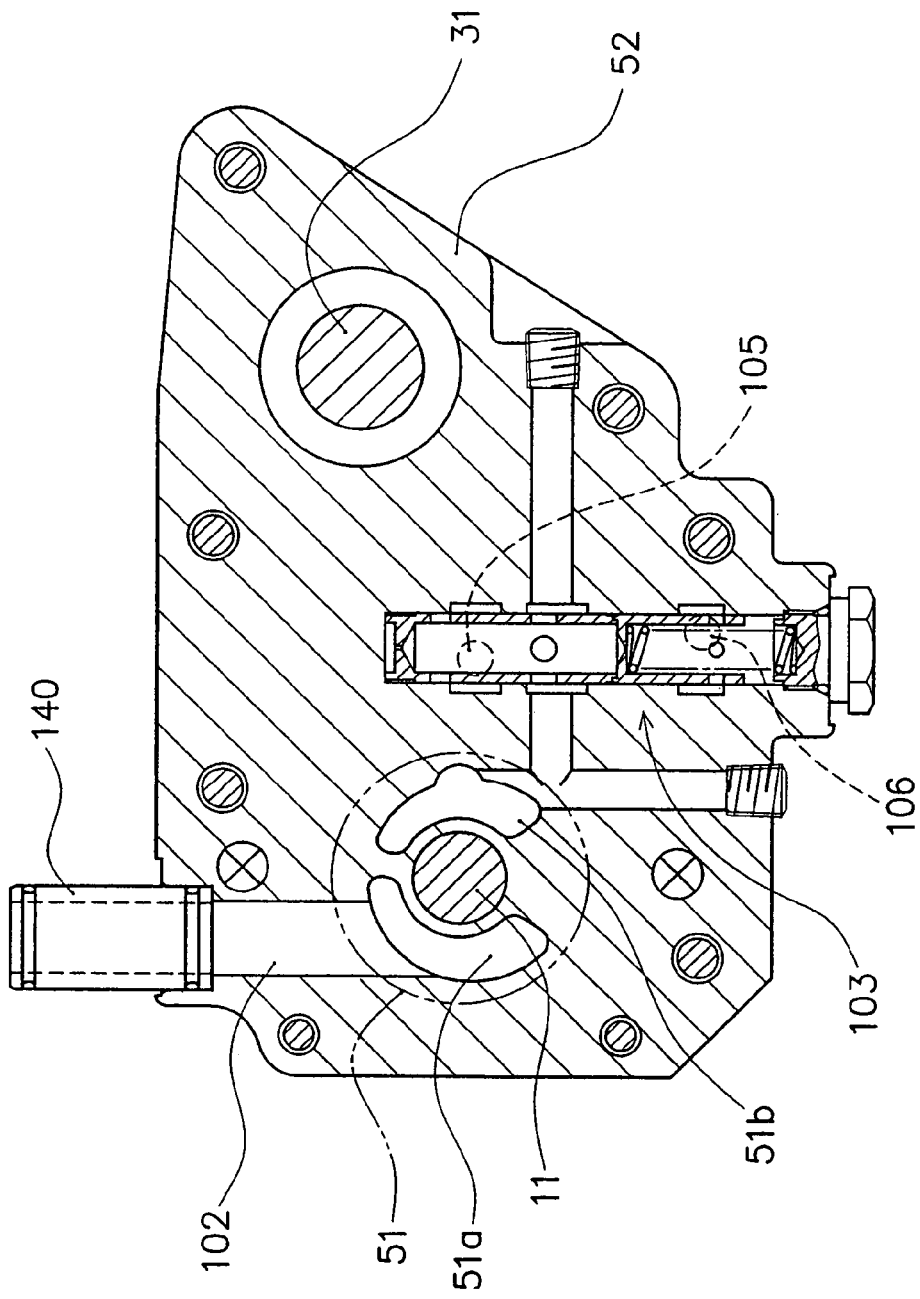
FIG. 6 is a cross-section taken along lines VI—VI in FIG. 3.
Figure 7:
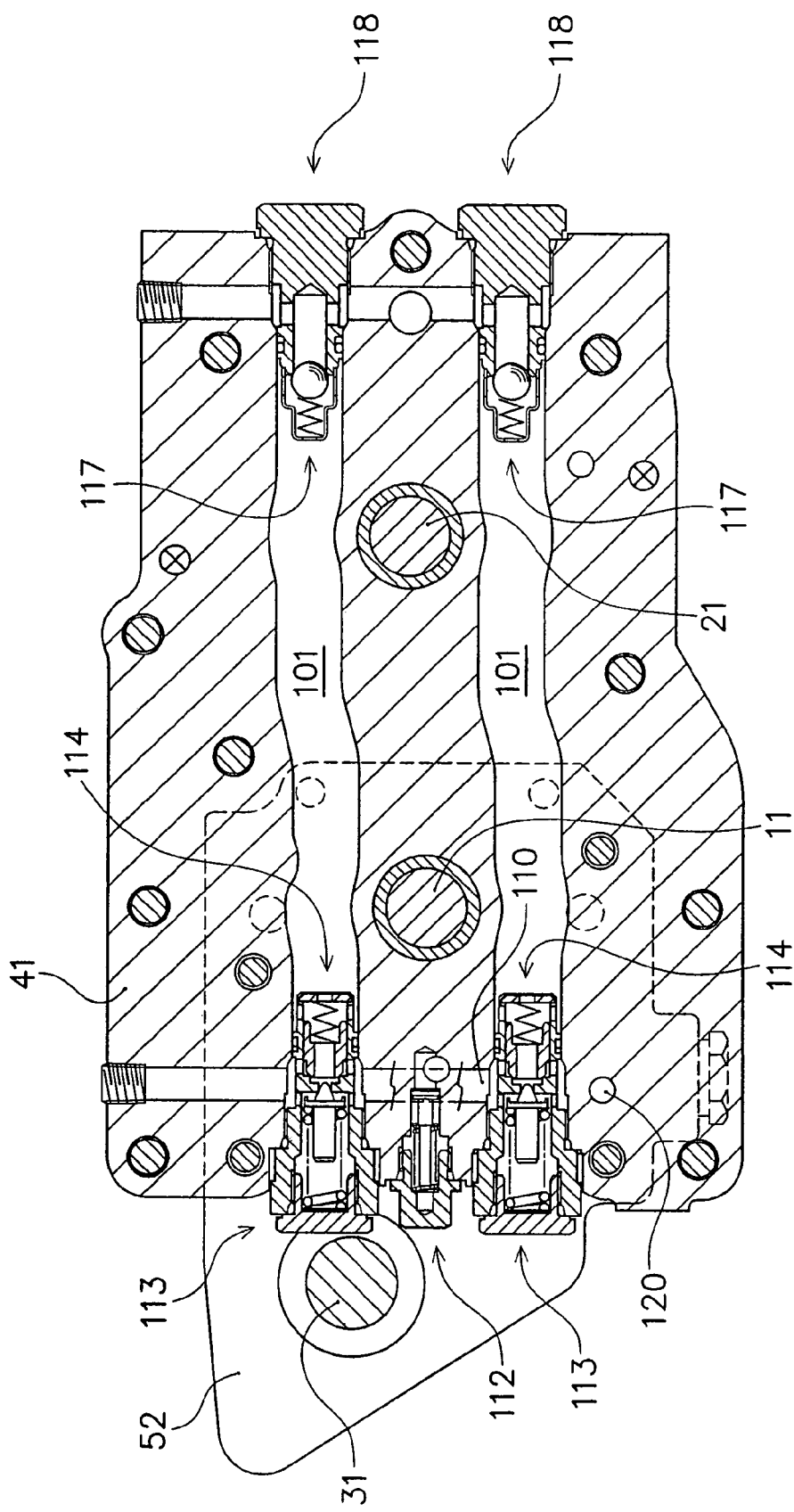
FIG. 7 is a cross-section taken along VII—VII in FIG. 3.

FIGS. 6 and 7 are respectively cross-sections taken along lines VI—VI and VII—VII in FIG. 3. FIG. 8 is a view as viewed along lines VIII—VIII in FIG. 3.

As illustrated in FIGS. 2 and 6, the charge pump case 52 is provided with inlet line 102 having a first end opening to the outside and a second end connected to inlet port 51a of the charge pump body 51, and pressurized fluid line 104 having a first end connected to outlet port 51b of the charge pump body 51 and a second end branched to first pressurized fluid line 105 and second pressurized fluid line 106 via flow divider 103 and then opening to the outside. The first end of the inlet line 102 is in communication with hydraulic fluid tank 400 via pipe fitting 140 (see FIGS. 2, 5 and 6).

As illustrated in FIGS. 2 and 7, the center section 41 to be connected to the charge pump case 52 is provided with the pair of hydraulic lines 101, first bypass line 110 for communication between the pair of hydraulic lines 101, charge line 111 having a first end communicated with the first pressurized fluid line 105 and a second end connected to the first bypass line 110, charge relief valve 112 interposed in the charge line 111, and pair of high pressure relief valves 113 and pair of charge check valves 114, which pairs are interposed in the first bypass line 110 between its connection point to the charge line 111 and its connection point to the pair of hydraulic lines 101.

The center section 41 is preferably and additionally provided with second bypass line 115 for communication between the pair of hydraulic lines 101, drain line 116 having a first end communicated with the second bypass line 115 and a second end communicated with the hydraulic fluid tank, and pair of suction valves 117 interposed in the second bypass line 115 between its connection point to the drain line 116 and its connection point to the pair of hydraulic lines 101. By providing the pair of suction valves 117, it is possible to prevent the generation of negative pressure in the pair of hydraulic lines 101 in the case where a vehicle stops on a slope with its engine stopped, and hence prevent the vehicle from rolling down on the slope (freewheeling).

As illustrated in FIGS. 2 and 4, the center section 41 is also provided with pressurized fluid feeding line 120 having a first end communicated with the second pressurized fluid line 106 and a second end opening to the inside of the HST housing 40.

The second end of the pressurized fluid feeding line 120 is communicated with PTO hydraulic line 122 formed in the rear wall of the HST housing 42 via conduit 121 disposed within the HST housing 121.

As illustrated in FIGS. 2 and 4, the HST housing 42 is provided with the PTO hydraulic line 122 having a first end connected to the conduit 121 and a second end connected to the hydraulic clutch device 32, relief valve 123, electromagnetic switching valve 124 and accumulator 125 respectively interposed in the PTO hydraulic line 122, and drain line 126 communicated with the electromagnetic switching valve 124.

The auxiliary pump case 64 is provided as illustrated in FIGS. 2 and 5 with third pressurized fluid line 130 passing through a meshing portion between the first pump gear 61 and the second pump gear 62 and having opposite ends opening to the outside.

Of the opposite ends of the third pressurized fluid line 130, first end 130a is connected via suitable conduit to a housing of the differential device 350, which housing also serves as the hydraulic fluid tank 400, so that the third pressurized fluid line 130 supplies the pressurized hydraulic fluid through second end 130b to hydraulic circuit 200 for elevation of the mower and actuation of the power steering device (see FIG. 2). The return fluid from the circuit 200 passes the inside of the HST housing 40 through a hydraulic fluid cooler, and then returns to the hydraulic fluid tank 400. Reference code 410 in FIG. 2 represents a common filter.

While the description in this embodiment was made by taking for example the case where the front axle 310 acts as the main driving axle and the PTO shaft 31 extends to the front side with respect to the fore-aft direction of the vehicle, the present invention is not necessarily limited to this embodiment. Rather, the present invention is also applicable to the arrangement where the rear axle acts as the main driving axle and the PTO shaft extends to the rear side with respect to the fore-aft direction of the vehicle.

The HST 1 is preferably provided with neutral return mechanism 480 for biasing the output adjusting member 14 to the neutral position in response to the tilting and rotating action of the output adjusting member 14 in the vehicle advancing direction or vehicle reversing direction. The vehicle advancing direction and vehicle reversing direction respectively mean the tilting or rotating directions that generate the rotational outputs respectively moving the vehicle forward and rearward.

Figure 16:
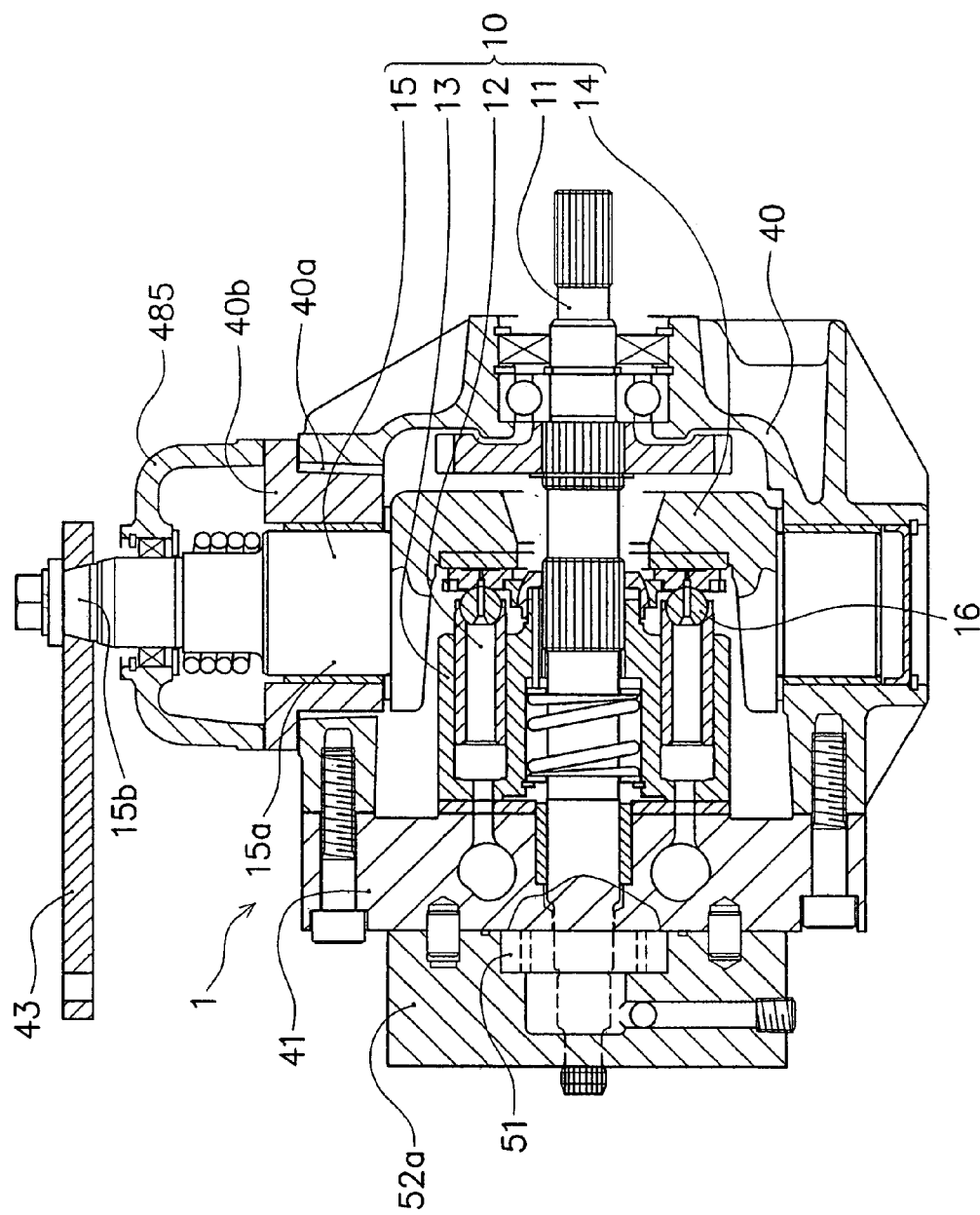
FIG. 16 is a cross-section taken along lines XVI—XVI in FIG. 3.

The description will be herein made for the neutral return mechanism 480. FIG. 16 is a cross-section taken along lines XVI—XVI in FIG. 3.

As illustrated in FIGS. 8 and 16, the control shaft 15 includes body 15a that is relatively rotatably supported on the housing 40 while being non-rotatable with respect to the output adjusting member 14, and outer extension 15b that outwardly extends from the body 15a to the outside of the housing 40, so that the tilting and rotating position of the output adjusting member 14 can be changed from the outside of the housing 40. That is, the output adjusting member 14 can be tilted and rotated through the rotation of the outer extension 15b of the control shaft 15 around the axis.

In this embodiment, the speed change arm 43 is connected to the outer extension 15b of the control shaft 15, and the free end of the speed change arm 43 is connected to the speed change pedal P disposed closer to a driver seat via a suitable connection member (not shown), as illustrated in FIGS. 10 and 16.

The control shaft 15 and the output adjusting member 14 may be integrally formed with each other, or separately formed while having a mechanism allowing the associated operation with each other.

The housing 40 preferably forms therein opening 40a through which the output adjusting member (movable swash plate in this embodiment) 14 can pass. By forming the opening 40a, it is possible to have the control shaft 15 and output adjusting member 14 connected or formed integrally with each other and mounted within the housing 40. In this arrangement, the clearance between the inner circumference of the opening 40a and the outer circumference of the control shaft 15 may be sealed by plate-like lid 40b with a bearing boss.

Figure 17:
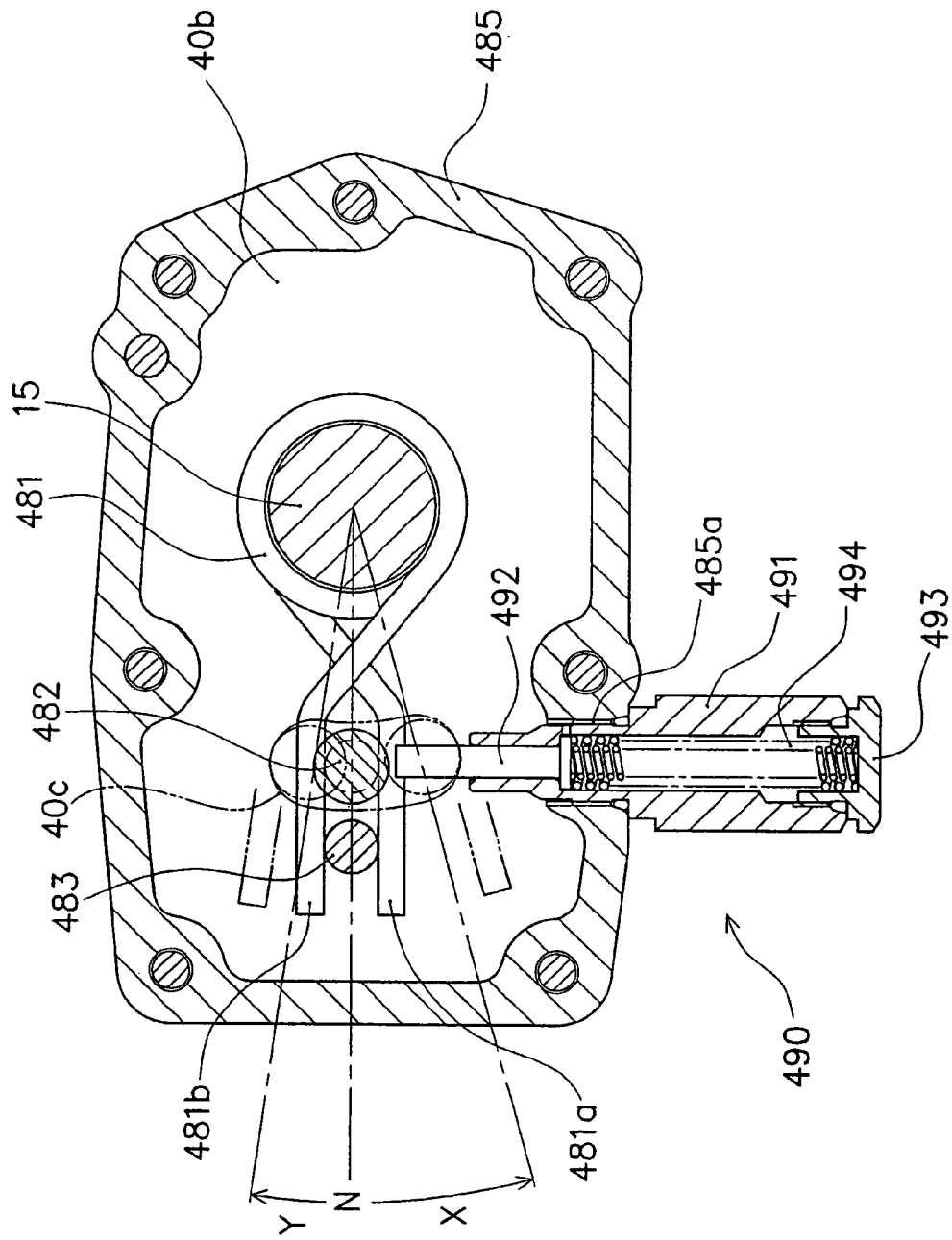
FIG. 17 is a cross-section taken along lines XVII—XVII in FIG. 8 with an output adjusting member lying at neutral position.
Figure 18:
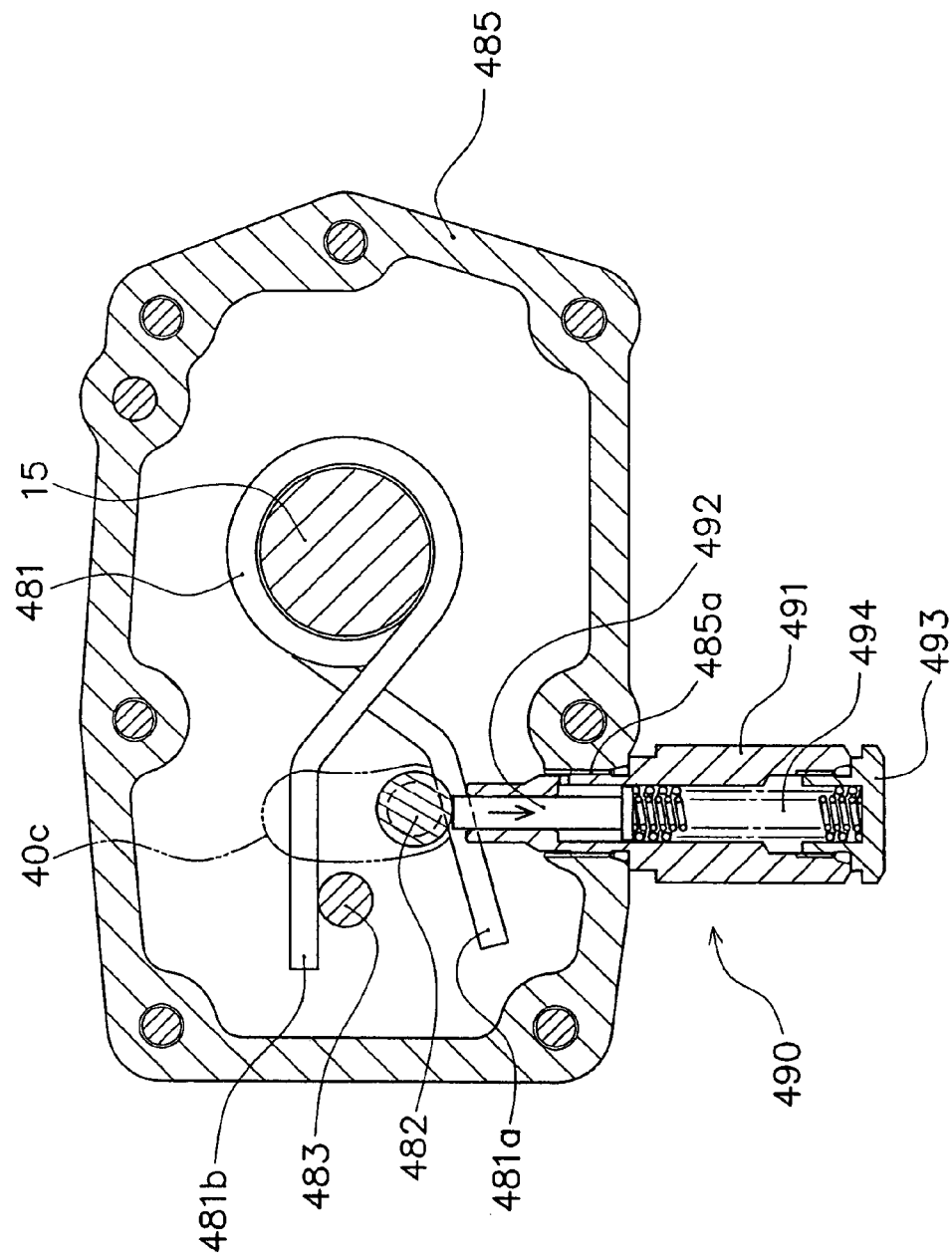
FIG. 18 is a cross-section taken along lines XVII—XVII in FIG. 8 with the output adjusting member lying at a maximum output position in the vehicle advancing direction.

FIGS. 17 and 18 are cross sections taken along lines XVII—XVII in FIG. 8 with the output adjusting member 14 set at the neutral position and the maximum output position in the vehicle advancing direction.

As illustrated in FIGS. 8 and 16–18, the neutral return mechanism 480 includes torsion spring 481 that is supported around the outer extension 15b of the control shaft 15, and detent pin 482 that lies at reference position N when the output adjusting member 14 is at the neutral position, and tilts and rotates in the X and Y-directions around the axis of the control shaft 15 by a displacement amount corresponding to a tilted and rotated position of the output adjusting member 14 when the output adjusting member 14 tilts and rotates in the vehicle advancing direction and reversing direction.

In this embodiment, the detent pin 482 has proximal end 482a connected to the output adjusting member 14 and distal end 482b extending outwardly from circular slot 40c formed in the lid 40b (see FIGS. 8 and 17–18), while both ends of the torsion spring 481 lie respectively on the both sides of the distal end 482b with respect to the moving direction thereof (see FIGS. 17 and 18).

With the above arrangement, the detent pin 482 presses first end 481a and second end 481b of the torsion spring 481 against its biasing force through its pivotal movement in the vehicle advancing direction (X direction) and reversing direction (Y direction).

The neutral return mechanism 480 includes fixing member 483 for fixing the second end 481b and first end 481a of the torsion spring 481 in position during the pivotal movement of the detent pin 482 in the vehicle advancing direction and reversing direction. Specifically, the fixing member 483 is adapted to limit the movement of the second end 481b of the torsion spring 481 during the detent pin 482 presses the first end 481a of the torsion spring 481, and limit the movement of the first end 481a of the torsion spring 481 during the detent pin 482 presses the second end 481b of the torsion spring 481.

In this embodiment, the neutral return mechanism 480 includes cover member 485 that is attached on the outer surface of the lid 40b to cover over the torsion spring 481 and the detent pin 482, thereby effectively preventing the intrusion of impurities such as dusts into the housing. A fixing pin to be fixed to the cover member 485 is used as the fixing member 483.

The fixing pin 483 is preferably an eccentric pin having body 483a to be interposed between the both ends 481a and 481b of the torsion spring 481, and an eccentric part 483b outwardly extending with its axis eccentric to the axis of the body 483a. Whereby, the relative position of the body 483a to the control shaft 15 can be varied through the rotation of the eccentric part 483b around the axis of the body 483a and hence adjustment of the output adjusting member 14 to the neutral position after assembling of the HST can easily be performed.

The neutral return mechanism 480 also includes auxiliary device 490 that biases the detent pin 482 to the reference position N during the pivotal movement of the detent pin 482.

As illustrated in FIGS. 17 and 18, the auxiliary device 490 includes cylindrical casing 491 fixed on the cover member 485 with an outer end positioned outside of the cover member 485, push pin 492 that is axially slidably placed in the cylindrical casing 491 with a distal end of the push pin 492 abuttable against the detent pin 482 by the pivotal movement of the detent pin 482, lid member 493 that seals the outer end of the cylindrical casing 491, and biasing spring 494 that is disposed between a distal end of the push pin 492 and the lid member 493.

The auxiliary device 490 is disposed so that the axial direction of the push pin 492 is substantially matched to the pivoting direction of the detent pin 482. That is, the auxiliary device 490 is designed so that the detent pin 482 presses the push pin 492 in the axial direction against the biasing force of the biasing spring 494 during the pivotal movement of the detent pin 482 from the reference position N in the vehicle advancing direction (X direction) and/or the vehicle reversing direction (Y direction), as illustrated in FIG. 18.

The lid member 493 is preferably fixed on the cylindrical casing 491 in such a manner as to be adjustably positioned along the axis of the cylindrical casing 491. With this arrangement, the biasing force of the biasing spring 494 can be suitably adjusted.

According to the HST 1 having the above arrangement, when the driver releases the manipulating member such as the manipulation lever (not shown) operatively connected to the output adjusting member 14 from the engaged state, the output adjusting member 14 automatically and promptly returns to the neutral position. Therefore, the braking distance for stopping the vehicle can be shortened by efficiently utilizing a dynamic brake by the HST 1.

That is, when the driver tilts or rotates the output adjusting member 14 in the vehicle advancing direction or reversing direction via the manipulating member and the control shaft 15, the detent pin 482 pivotally moves against the biasing forces effected by two biasing members, namely the torsion spring 481 supported around the control shaft and the biasing spring 494 of the auxiliary device 490. Accordingly, the driver's releasing action causes the detent pin 482 to return to the reference position N by the biasing forces of both the torsion spring 481 and the biasing spring 494, so that the output adjusting member 14 promptly returns to the neutral position.

Where the HST has the movable swash plate as the output adjusting member 14 and employs a so-called shoe-type arrangement that the movable swash plate and the axial piston unit are connected together via universal joint 16 (see FIG. 16), a self-return moment of the movable swash plate for returning to the neutral position is small so that this arrangement is particularly effective for the desirable effect as mentioned above.

Since the auxiliary device 490 is of a simple arrangement that has only the push pin 492 and the biasing spring 494 as main components, it is possible to produce the above desirable effect, while not inviting the large-sizing and complexity of the entire HST.

It is preferable to limit the tilting or rotating range of the output adjusting member 14, thereby effectively preventing excessive increase in vehicle speed. In this embodiment, the housing 40 forms therein the slot 40c defining the pivoting range of the detent pin 482, so that the slot 40c limits the pivoting range of the detent pin 482 or the tilting range of the output adjusting member 14. More preferably, the output adjusting member 14 has a smaller tilting range in the vehicle reversing direction than in the vehicle advancing direction, so that the maximum speed in the vehicle reversing direction can effectively be limited.

The arrangement for limiting the tilting range of the output adjusting member 14 may be varied. For example, it is possible to provide in the housing 40 a pair of stoppers that are abuttable to the output adjusting member 14.

The auxiliary device 490 may be selectively provided on either one or both of a vehicle advancing side and reversing side of the detent pin 482 for a desirable arrangement. Specifically, openings 485a for the attachment of the auxiliary device are respectively formed in the walls on the vehicle advancing side and the vehicle reversing side of the detent pin 482 in the cover member 485, so that the auxiliary device 490 can be selectively attached in place without needs of separate operations or parts for obtaining a suitable arrangement. Accordingly, if it is desired to prevent the abrupt stop of the vehicle, the auxiliary device 490 may be provided only on the vehicle advancing side of the detent pin 482.

With the arrangement as described above, where the detent pin is pivotally movable around the control shaft in association with the tilting action of the output adjusting member in the variable displacement type unit, and during the tilting of the detent pin from the reference position, the detent pin is biased towards the reference position through the biasing force of the auxiliary device as well as the biasing force by the torsion spring supported on the control shaft, the output adjusting member automatically and promptly returns to the neutral position once the driver releases the output adjusting member from the operational mode. Therefore, the dynamic brake action by the HST can promptly and effectively be produced at the time of stopping the vehicle, and therefore the braking distance of the vehicle can be shortened.

By having the auxiliary device acting only during the vehicle runs in the advance direction, it is possible to effectively prevent sudden stop of the vehicle when the vehicle runs in the reverse direction.

By employing the auxiliary device including the pressing member abuttable against the detent pin and the biasing member biasing the detent pin towards the reference position via the pressing member during the pivotal movement of the detent pin, the above desirable effects can be produced through such a remarkably simple structure.

When the biasing member is a spring having the distal end abutted against the pressing member and the proximal end supported by a biasing-force adjusting member, which can be fixed at a given position along the axis along which the spring is compressed and expanded, it is possible to properly adjust the biasing force effected by the spring to the detent pin. Accordingly, the dynamic brake action by the HST can be properly adjusted according to preference.

In this embodiment, the auxiliary pump unit 60 is provided in addition to the charge pump unit 50, where the charge pump unit 50 is used for feeding pressurized hydraulic fluid to the pair of hydraulic lines 101 and the hydraulic clutch device 32 in the PTO unit 30, while the auxiliary pump unit 60 is used for feeding the pressurized hydraulic fluid to the mower elevation device and/or the power steering device. This arrangement thus enables the feeding of a large amount of pressurized hydraulic fluid, but may invite cost increase due to the increased number of pumps.

To address the above, where a relatively small amount of hydraulic fluid to be fed is acceptable, only a single charge pump unit 50' may be used, thereby achieving the feeding of the pressurized hydraulic fluid to those three devices, while reducing the costs involved.

Figure 19:
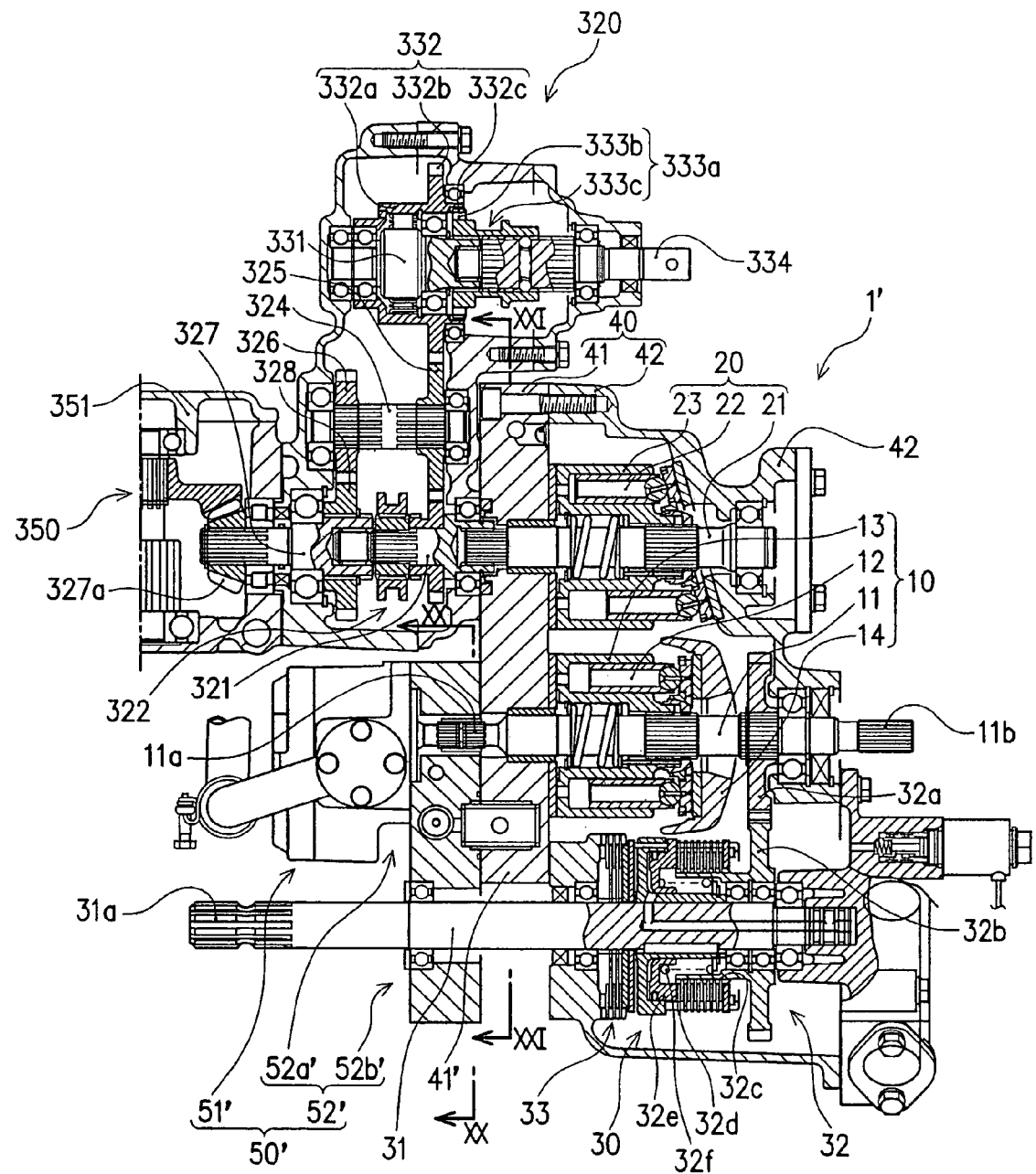
FIG. 19 is a transverse plan view of an HST equipped with a single charge pump unit.
Figure 20:
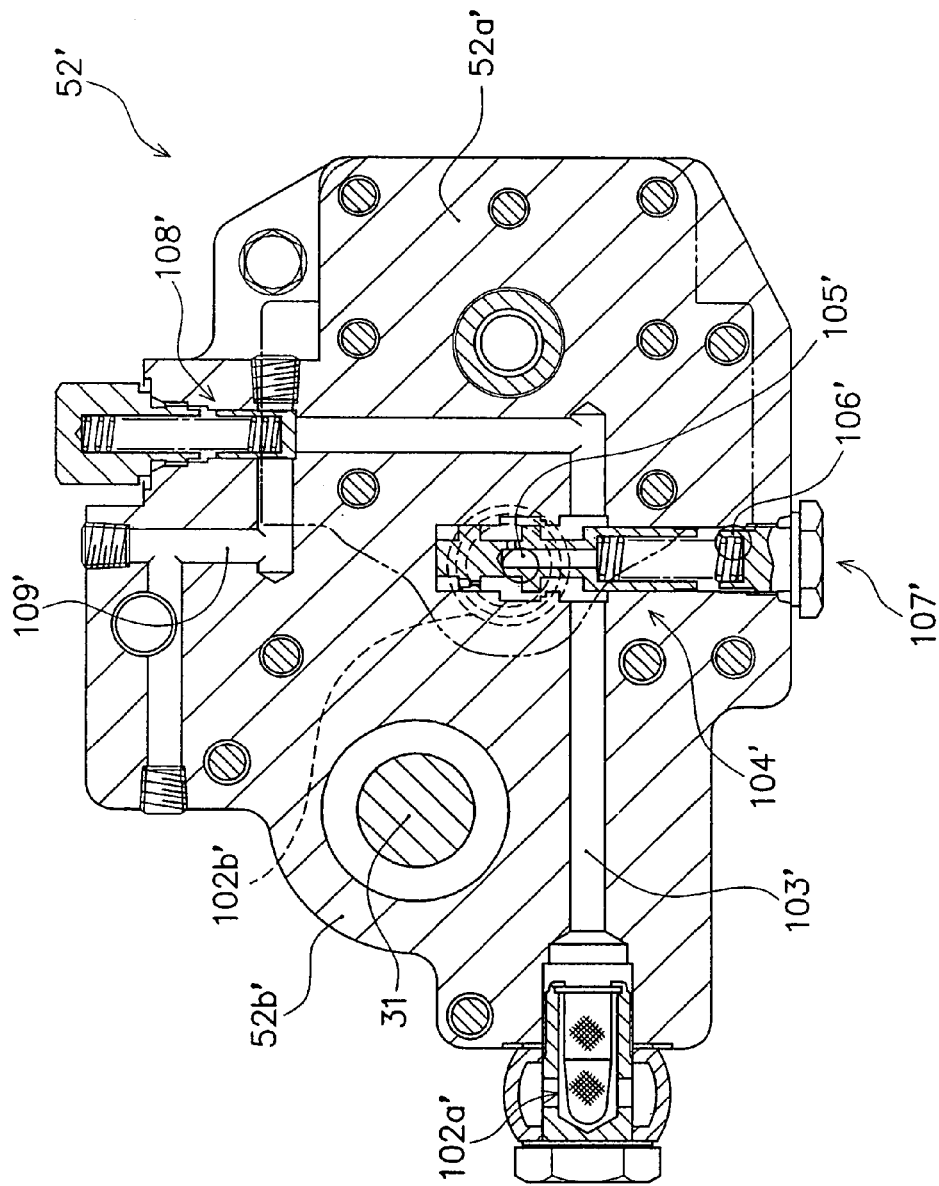
FIG. 20 is a cross-section taken along lines XX—XX in FIG. 19.
Figure 21:
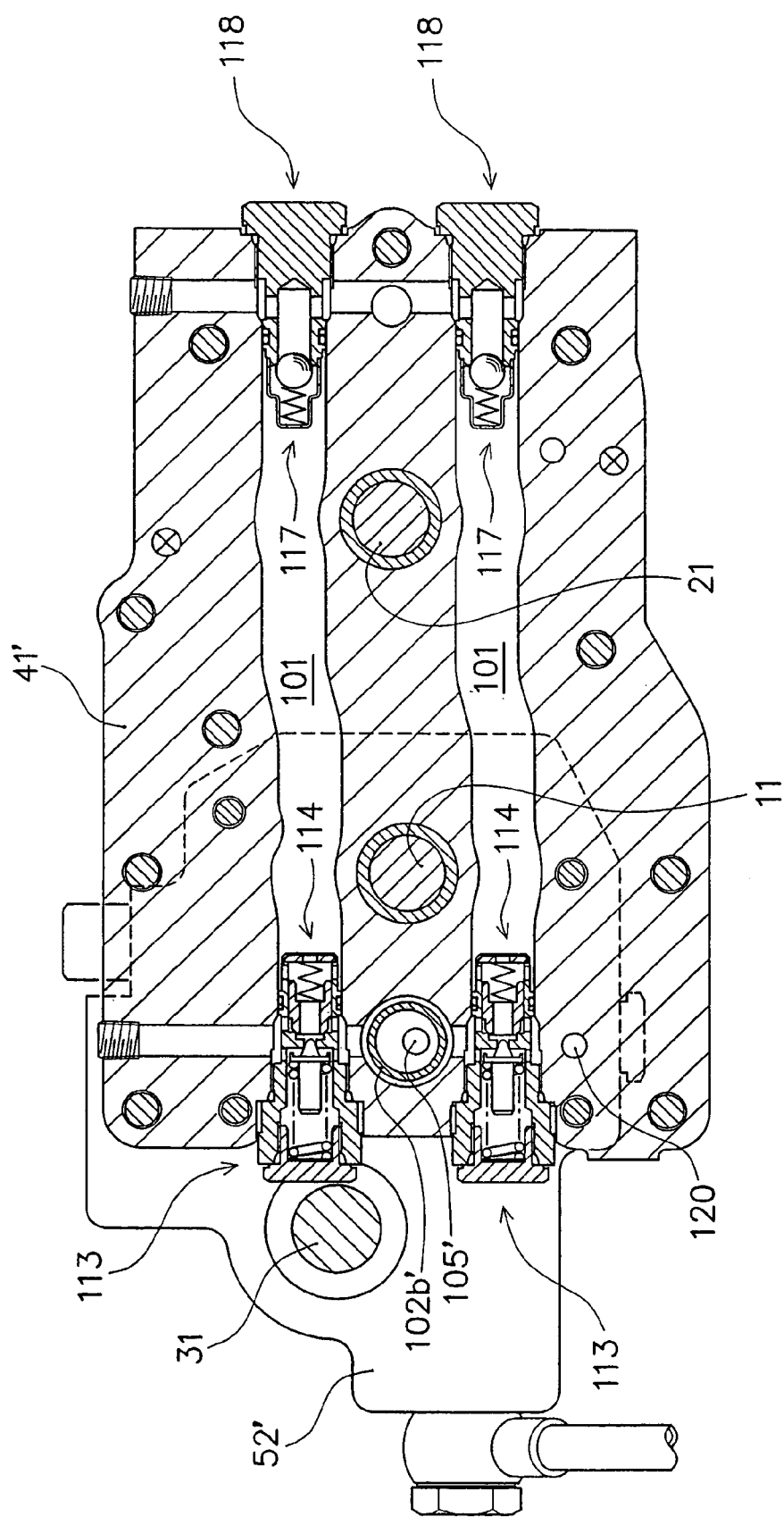
FIG. 21 is a cross-section taken along lines XXI—XXI in FIG. 19.
Figure 22:
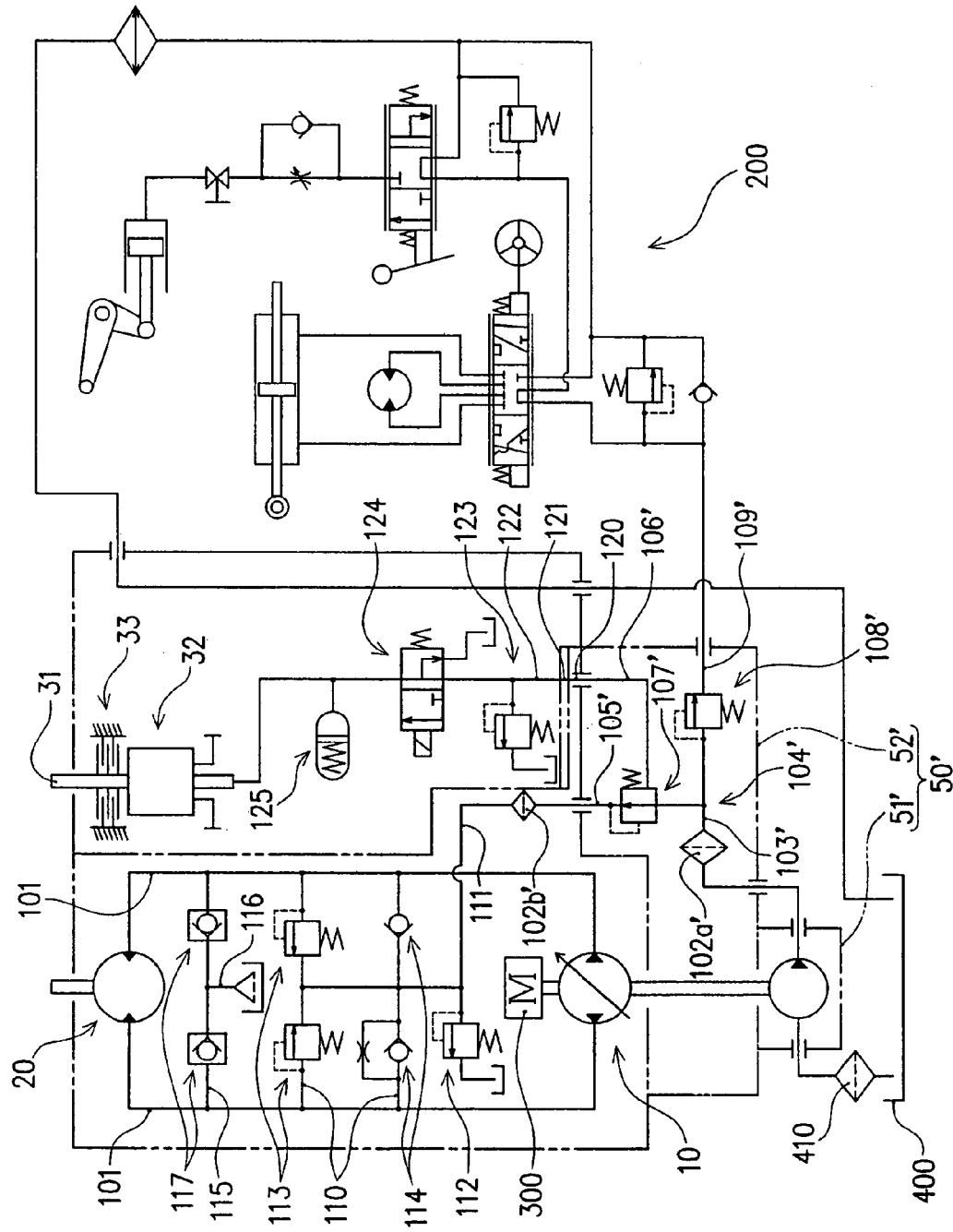
FIG. 22 is a hydraulic circuit diagram of the vehicle to which the HST of the FIG. 19 is applied.

FIG. 19 is a transverse plan view of HST 1' equipped only with the charge pump unit 50'. FIGS. 20 and 21 are cross-sections taken along lines XX—XX and XXI—XXI in FIG. 19. Further, FIG. 22 is a hydraulic circuit diagram of the vehicle to which the HST 1' is applied. In the following description on the embodiment illustrated in FIGS. 19 to 22, same or identical parts to those of this embodiment have been give the same reference characters to omit a detailed description thereof.

As illustrated in FIG. 19, the charge pump unit 50' includes charge pump body 51' that is driven through the front extension 11a of the pump shaft 11, and charge pump case 52' that is connected to the HST housing 40 while supporting thereon the charge pump body 51'.

The charge pump case 52' includes central part 52a' that forms therein a herein described hydraulic line into which the pressurized hydraulic fluid flows from the charge pump body 51', and extension 52b' that extends from the central part 52a' outwardly with respect to the vehicle width direction, so that the front extension 31a of the PTO shaft 31 can be bearing-supported by the extension 52b'.

The charge pump case 52' is provided with inlet line 103' that receives the pressurized hydraulic fluid from the charge pump body 51' via filter 102a', pressurized fluid charge line 105' and pressurized fluid line 109' for the hydraulic device that are branched from the inlet line 103' via branching part 104', pressure reducing valve 107' that is mounted in the pressurized fluid charge line 105' to set a charging hydraulic pressure, pressurized fluid line 106' for the PTO that receives a surplus fluid discharged through the pressure reducing valve 107', and resistive valve 108' that is mounted in the pressurized fluid line 109' for the hydraulic device.

The pressurized fluid charge line 105' is communicated with the charge line 111 via the filter 102b'. The pressurized fluid line 106' for the PTO is communicated with the hydraulic line 122 for the PTO via the hydraulic fluid feeding line 120 and the conduit 121. The pressurized fluid line 109' for the hydraulic device is opened in the rear side of the charge pump case 52' and is communicated with the hydraulic circuit 200 for the working device via a suitable conduit.

This specification is by no means intended to restrict the present invention to the preferred embodiments set forth therein. Various modifications to the hydrostatic transmission and the power train for vehicle, as described herein, may be made by those skilled in the art without departing from the spirit and scope of the present invention as defined in the appended claims.

What is claimed is:

1. A power train for four-wheel drive vehicle comprising:
a transfer device provided between a main output shaft of a main speed change device operatively connected to a driving power source and an input shaft of a differential gear device for a first driving wheel, the input shaft being disposed on a main drive-power transmission axis coaxial with the main output shaft, the transfer, device being constructed so as to transmit power including transmission along the main transmission axis;
the main speed change device being an HST that includes a hydraulic pump having a pump shaft operatively connected to the driving power source, a hydraulic motor having a motor shaft functioning as the main output shaft, a PTO unit having a PTO shaft for a working machine, and an HST housing accommodating the hydraulic pump, the hydraulic motor and the PTO unit;
the transfer device including an extension extending past the main speed change device in a direction orthogonal to the main drive-power transmission axis, and a PTO shaft for a second driving wheel, capable of taking out rotational power synchronized with the input shaft;

the PTO shaft for a working machine being positioned on a side opposite to the hydraulic motor with respect to the hydraulic pump; and the PTO shaft for a second driving wheel being positioned on a side opposite to the hydraulic pump with respect to the hydraulic motor and supported by the extension in such a manner as to be parallel to the main drive-power transmission axis and project outward at one end thereof.

2. A transfer device for four-wheel drive vehicle provided between a main output shaft of a main speed change device operatively connected to a driving power source and an input shaft of a differential gear device for a first driving wheel, the input shaft being disposed on a main drive-power transmission axis coaxial with the main output shaft, the transfer device being constructed so as to transmit power including transmission along a main driving-power transmission axis and take out the power for a second driving wheel, the transfer device comprising:

a driving gear disposed on the main output shaft;

a driven gear disposed on the input shaft;

a counter shaft substantially parallel to the main driving-power transmission axis;

a driven counter gear and a driving counter gear provided on the counter shaft, the driven counter gear receiving power from the driving gear while the driving counter gear transmitting power to the driven gear, a transmission ratio from the driving gear to the driven counter gear being substantially equal to that from the driving counter gear to the driven gear;

a slider capable of selecting a first speed position, at which rotation of the output shaft is transmitted directly to the input shaft, and a second speed position, at which the rotation of the output shaft is transmitted to the input shaft from the driving gear via the driving counter gear, the driven counter gear and the driven gear; and a PTO shaft substantially parallel to the counter shaft, for receiving the power directly from either one of the driven counter gear and the driving counter gear.

3. A transfer device according to claim 2, wherein:

the main speed change device is an HST; and the speed shift device can select a neutral position, at which no rotation of the main output shaft is transmitted to the input shaft, in addition to the first and second speed positions.

4. A transfer device for four-wheel drive vehicle provided between a main output shaft of a main speed change device operatively connected to a driving power source and an input shaft of a differential gear device for a first driving wheel, the input shaft being disposed on a main drive-power transmission axis coaxial with the main output shaft, the transfer device being constructed so as to transmit power including transmission along a main driving-power transmission axis and take out the power for a second driving wheel, the transfer device comprising:

a driving gear disposed on the main output shaft;

a driven gear disposed on the input shaft;

a counter shaft substantially parallel to the main driving-power transmission axis;

a driven counter gear and a driving counter gear provided on the counter shaft the driven counter gear receiving power from the driving gear while the driving counter gear transmitting power to the driven gear, a transmission ratio from the driving gear to the driven counter gear being substantially equal to tat from the driving counter gear to the driven gear;

a slider capable of selecting a first speed position, at which rotation of the output shaft is transmitted directly to the input shaft, and a second speed position, at which the rotation of the output shaft is transmitted to the input shaft from the driving gear via the driving counter gear, the driven counter gear and the driven gear; and a PTO shaft substantially parallel to the counter shaft, for receiving the power from either one of the driven counter gear and the driving counter gear whether or not the first speed position or the second speed position is selected.

* * * * *

UNITED STATES PATENT AND TRADEMARK OFFICE
CERTIFICATE OF CORRECTION

| | | |
|---|---|---|
| PATENT NO. | : 7,150,693 B2 | Page 1 of 1 |
| APPLICATION NO. | : 10/942932 | |
| DATED | : December 19, 2006 | |
| INVENTOR(S) | : Yoshitaka Ishimaru | |

It is certified that error appears in the above-identified patent and that said Letters Patent is hereby corrected as shown below:

Column 22, line 22, "on the counter shaft the driven counter gear" should read --on the counter shaft, the driven counter gear--.

Column 22, line 26, "gear being substantially equal to tat" should read --gear being substantially equal to that--.

Signed and Sealed this

Twenty-seventh Day of March, 2007

JON W. DUDAS
*Director of the United States Patent and Trademark Office*